(12) United States Patent
Yoda et al.

(10) Patent No.: US 10,768,894 B2
(45) Date of Patent: Sep. 8, 2020

(54) PROCESSOR, INFORMATION PROCESSING APPARATUS AND OPERATION METHOD FOR PROCESSOR

(71) Applicant: FUJITSU LIMITED, Kawasaki-shi, Kanagawa (JP)

(72) Inventors: Katsuhiro Yoda, Kodaira (JP); Mitsuru Tomono, Higashimurayama (JP); Takahiro Notsu, Kawasaki (JP); Makiko Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/352,919

(22) Filed: Mar. 14, 2019

(65) Prior Publication Data

US 2019/0212982 A1 Jul. 11, 2019

Related U.S. Application Data

(63) Continuation of application No. PCT/JP2018/000279, filed on Jan. 10, 2018.

(30) Foreign Application Priority Data

Jan. 27, 2017 (JP) .............................. 2017-013396

(51) Int. Cl.
*G06F 7/485* (2006.01)
*G06F 7/487* (2006.01)
(Continued)

(52) U.S. Cl.
CPC ............ *G06F 7/4876* (2013.01); *G06F 7/485* (2013.01); *G06F 7/5443* (2013.01); *G06F 9/38* (2013.01);
(Continued)

(58) Field of Classification Search
CPC .......... G06F 9/38; G06F 15/80; G06F 17/153; G06F 17/16; G06N 3/063; G06T 1/20
(Continued)

(56) References Cited

U.S. PATENT DOCUMENTS 4,701,876 A 10/1987 McCanny et al.
2014/0052967 A1 2/2014 Son et al.

FOREIGN PATENT DOCUMENTS

JP 60-97464 5/1985
JP 2014-038624 2/2014

OTHER PUBLICATIONS

International Search Report attached with the Written Opinion of the International Searching Authority, mailed in connection with PCT/JP2018/000279 and dated Apr. 10, 2018, with partial English translation (10 pages).

*Primary Examiner* — Tan V Mai
(74) *Attorney, Agent, or Firm* — Fujitsu Patent Center

(57) ABSTRACT

A processor includes: a plurality of processor cores; and an internal memory configured to be accessed from the plurality of processor cores, wherein an arithmetic circuit provided in any of the plurality of processor cores includes: a plurality of first registers provided in a first stage of the arithmetic circuit, a regular addition circuit including a first adder and a second register, the first adder being configured to add a plurality of outputs of the plurality of first registers, the second register being configured to be provided in a second stage and latch an output of the first adder, an overtaking addition circuit including a second adder, the second adder being configured to add a plurality of outputs of the plurality of first registers, and a synthesis circuit including a third adder and a third register.

8 Claims, 22 Drawing Sheets

(51) Int. Cl.
*G06T 1/20* (2006.01)
*G06F 17/16* (2006.01)
*G06F 17/15* (2006.01)
*G06F 9/38* (2018.01)
*G06N 3/063* (2006.01)
*G06F 7/544* (2006.01)
*G06F 15/80* (2006.01)

(52) U.S. Cl.
CPC ............ *G06F 15/80* (2013.01); *G06F 17/153* (2013.01); *G06F 17/16* (2013.01); *G06N 3/063* (2013.01); *G06T 1/20* (2013.01)

(58) Field of Classification Search
USPC .................................. 708/490, 503, 603, 670
See application file for complete search history.

IN_DATA

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DATA | a0 | a1 | a2 | a3 | a4 | a5 | a6 | a7 | a8 | 0 | 0 | 0 | 0 | 0 | 0 | 0 |
| | b0 | b1 | b2 | b3 | b4 | b5 | b6 | b7 | b8 | 0 | 0 | 0 | 0 | 0 | 0 | 0 |
| | c0 | c1 | c2 | c3 | c4 | c5 | c6 | c7 | c8 | 0 | 0 | 0 | 0 | 0 | 0 | 0 |
| | d0 | d1 | d2 | d3 | d4 | d5 | d6 | d7 | d8 | 0 | 0 | 0 | 0 | 0 | 0 | 0 |

FLT (W0-W8)

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| WEIGHT | W0 | W1 | W2 | W3 | W4 | W5 | W6 | W7 | W8 | 0 | 0 | 0 | 0 | 0 | 0 | 0 |

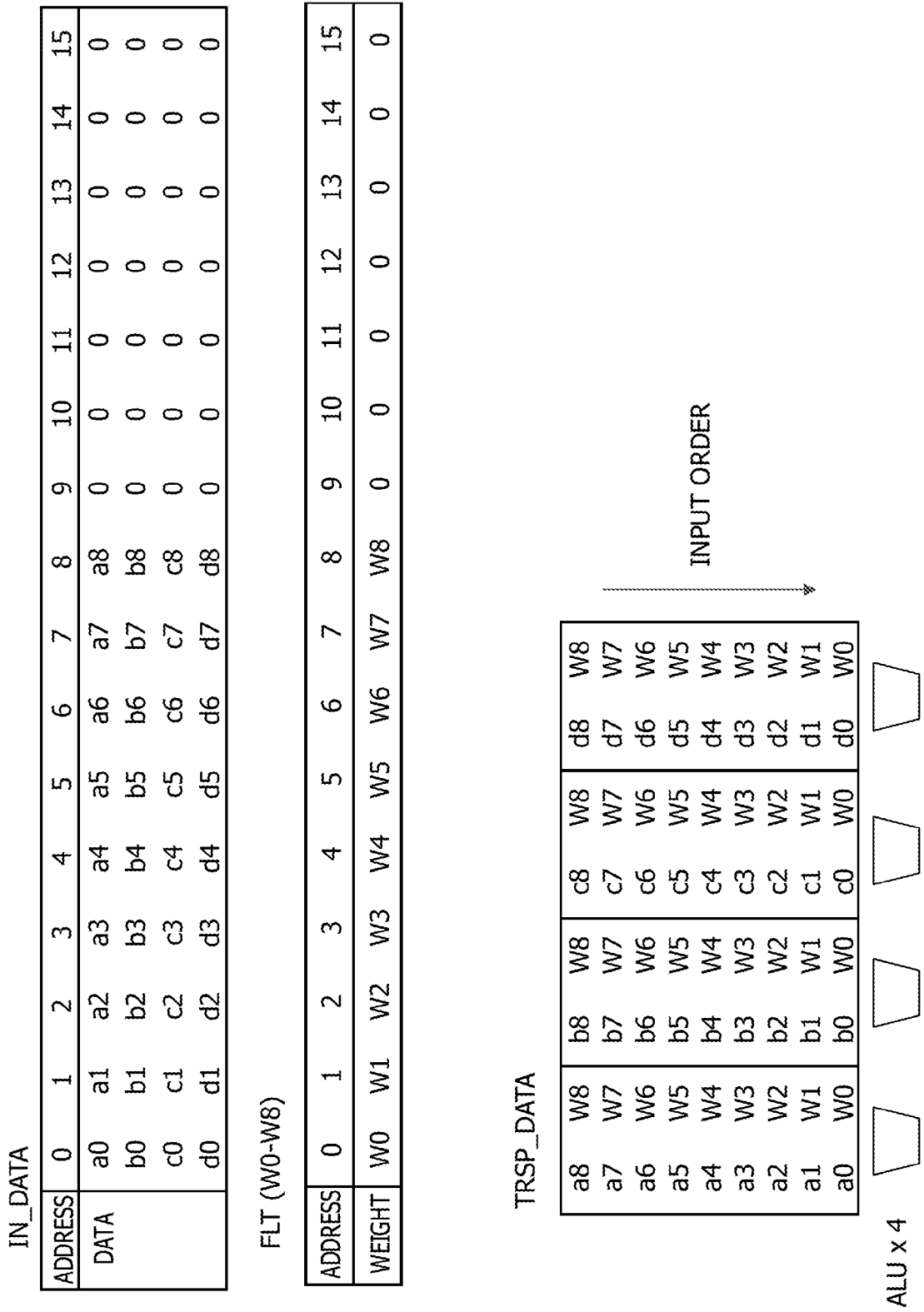

FIG. 14

| | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| ST0 | RG00 | a0 | a8 | b7 | c6 | d5 | e4 | f3 | g2 | h1 | i0 | i8 | | | |
| | RG01 | a1 | b0 | b8 | c7 | d6 | e5 | f4 | g3 | h2 | i1 | j0 | | | |
| | RG02 | a2 | b1 | c0 | c8 | d7 | e6 | f5 | g4 | h3 | i2 | j1 | | | |
| | RG03 | a3 | b2 | c1 | d0 | d8 | e7 | f6 | g5 | h4 | i3 | j2 | | | |
| | RG04 | a4 | b3 | c2 | d1 | e0 | f0 | f7 | g6 | h5 | i4 | j3 | | | |
| | RG05 | a5 | b4 | c3 | d2 | e1 | f1 | f8 | g7 | h6 | i5 | j4 | | | |
| | RG06 | a6 | b5 | c4 | d3 | e2 | f2 | g0 | g8 | h7 | i6 | j5 | | | |
| | RG07 | a7 | b6 | c5 | d4 | e3 | | g1 | h0 | h8 | i7 | j6 | | | |
| ST1 | RG10 | | a0 | a8 | b7 | c6 | d5 | e4 | f3 | g2 | h1 | i0 | i8 | | |
| | RG11 | | a1 | b0 | b8 | c7 | d6 | e5 | f4 | g3 | h2 | i1 | j0 | | |
| | RG12 | | a2 | b1 | c0 | c8 | d7 | e6 | f5 | g4 | h3 | i2 | j1 | | |
| | RG13 | | a3 | b2 | c1 | d0 | d8 | e7 | f6 | g5 | h4 | i3 | j2 | | |
| | RG14 | | a4 | b3 | c2 | d1 | e0 | f0 | f7 | g6 | h5 | i4 | j3 | | |
| | RG15 | | a5 | b4 | c3 | d2 | e1 | f1 | f8 | g7 | h6 | i5 | j4 | | |
| | RG16 | | a6 | b5 | c4 | d3 | e2 | f2 | g0 | g8 | h7 | i6 | j5 | | |
| | RG17 | | a7 | b6 | c5 | d4 | e3 | | g1 | h0 | h8 | i7 | j6 | | |
| ST2 | O_AD20 | | | a0,1 | a8 | b7,8 | c6,7 | d5,6 | e4,5 | f3,4 | g2,3 | h1,2 | i0,1 | i8 | |
| | O_AD21 | | | a2,3 | | | c8 | d7,8 | e6,7 | f5,6 | g4,5 | h3,4 | i2,3 | j0 | |
| | RG20 | | | | b0 | c0,1 | d0 | | e8 | | g6,7 | h5,6 | i4,5 | j1,2 | |
| | RG21 | | | | b1,2 | | | | | f7,8 | g8 | h7,8 | i6,7 | | |
| | O_AD22 | | | a4,5 | b3,4 | c2,3 | d1,2 | e0,1 | f0 | | h0 | i0 | | j3,4 | |
| | O_AD23 | | | a6,7 | b5,6 | c4,5 | d3,4 | e2,3 | f1,2 | g0,1 | | | | j5,6 | |
| | RG22 | | | | a0-3,8 | b0-2,7,8 | c0,1,6-8 | d0,5-8 | e4-7 | f3-6 | g2-5 | h1-4 | i0-3,8 | j3,4 | i0-8 |
| | RG23 | | | | a4-7 | b3-6 | c2-5 | d1-4 | e0-3,8 | f0-2,3,8 | g0-1,6-8 | h0,5-8 | i4-7 | j5,6 | i4-7 |
| ST3 | RG30 | | | | | a0-8 | b0-8 | c0-8 | d0-8 | e0-8 | f0-8 | g0-8 | h0-8 | i0-3,8 | |
| | RG31 | | | | | | | | | | | | | | |
| ST4 | RG40 | | | | | | a0-8 | b0-8 | c0-8 | d0-8 | e0-8 | f0-8 | g0-8 | h0-8 | |
| ST5 | RG50 | | | | | | | a0-8 | b0-8 | c0-8 | d0-8 | e0-8 | f0-8 | g0-8 | h0-8 |
| | RESULT | | | | | | | | | | | | | | |

FIG. 15

| CYCLE | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Mb0 | Mc0 | 0 | 0 | 0 | 1 | 1 | 1 | 1 | 1 | 1 | 1 | 1 | 0 | | |
| Mb1 | Mc1 | 0 | 0 | 0 | 0 | 1 | 1 | 1 | 1 | 1 | 1 | 1 | 0 | | |
| Mb2 | Mc2 | 0 | 0 | 0 | 0 | 0 | 1 | 1 | 1 | 1 | 1 | 1 | 0 | | |
| Mb3 | Mc3 | 0 | 1 | 1 | 0 | 0 | 0 | 0 | 0 | 0 | 0 | 0 | 1 | | |
| Mb4 | Mc4 | 1 | 1 | 1 | 1 | 0 | 0 | 0 | 0 | 0 | 0 | 0 | 1 | | |
| Mb5 | Mc5 | 1 | 1 | 1 | 1 | 1 | 0 | 0 | 0 | 0 | 0 | 0 | 1 | | |
| Mb6 | Mc6 | 1 | 1 | 1 | 1 | 1 | 1 | 0 | 0 | 0 | 0 | 0 | 1 | | |
| Mb7 | Mc7 | 0 | 0 | 0 | 0 | 0 | 0 | 0 | 1 | 1 | 1 | 1 | 0 | | |
|      |     | 0 | 0 | 0 | 0 | 0 | 0 | 0 | 0 | 1 | 1 | 1 | 0 | | |
|      |     | 0 | 0 | 0 | 0 | 0 | 0 | 1 | 0 | 0 | 1 | 1 | 0 | | |
|      |     | 1 | 1 | 1 | 1 | 1 | 1 | 1 | 1 | 0 | 0 | 0 | 1 | | |
|      |     | 1 | 1 | 1 | 1 | 1 | 1 | 1 | 1 | 1 | 0 | 0 | 1 | | |
|      |     | 1 | 1 | 1 | 1 | 1 | 1 | 1 | 1 | 1 | 1 | 0 | 1 | | |
|      |     | 1 | 1 | 1 | 1 | 1 | 1 | 1 | 1 | 1 | 1 | 0 | 1 | | |

FIG. 16

| | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| ST0 | RG00 | a0 | a8 | a16 | a24 | b7 | b15 | b23 | c6 | c14 | c22 | d5 | | | |
| | RG01 | a1 | a9 | a17 | b0 | b8 | b16 | b24 | c7 | c15 | c23 | d6 | | | |
| | RG02 | a2 | a10 | a18 | b1 | b9 | b17 | c0 | c8 | c16 | c24 | d7 | | | |
| | RG03 | a3 | a11 | a19 | b2 | b10 | b18 | c1 | c9 | c17 | d0 | d8 | | | |
| | RG04 | a4 | a12 | a20 | b3 | b11 | b19 | c2 | c10 | c18 | d1 | d9 | | | |
| | RG05 | a5 | a13 | a21 | b4 | b12 | b20 | c3 | c11 | c19 | d2 | d10 | | | |
| | RG06 | a6 | a14 | a22 | b5 | b13 | b21 | c4 | c12 | c20 | d3 | d11 | | | |
| | RG07 | a7 | a15 | a23 | b6 | b14 | b22 | c5 | c13 | c21 | d4 | d12 | | | |
| ST1 | RG10 | | a0 | a8 | a16 | a24 | b7 | b15 | b23 | c6 | c14 | c22 | d5 | | |
| | RG11 | | a1 | a9 | a17 | b0 | b8 | b16 | b24 | c7 | c15 | c23 | d6 | | |
| | RG12 | | a2 | a10 | a18 | b1 | b9 | b17 | c0 | c8 | c16 | c24 | d7 | | |
| | RG13 | | a3 | a11 | a19 | b2 | b10 | b18 | c1 | c9 | c17 | d0 | d8 | | |
| | RG14 | | a4 | a12 | a20 | b3 | b11 | b19 | c2 | c10 | c18 | d1 | d9 | | |
| | RG15 | | a5 | a13 | a21 | b4 | b12 | b20 | c3 | c11 | c19 | d2 | d10 | | |
| | RG16 | | a6 | a14 | a22 | b5 | b13 | b21 | c4 | c12 | c20 | d3 | d11 | | |
| | RG17 | | a7 | a15 | a23 | b6 | b14 | b22 | c5 | c13 | c21 | d4 | d12 | | |
| ST2 | O_AD20 | | | | | | | | | | | | c22,23 | | |
| | O_AD21 | | | | | | | | | | | | c24 | | |
| | RG20 | | | a0,1 | a8,9 | a16,17 | b0 | b7,8 | b15,16 | b23,24 | c6,7 | c14,15 | d5,6 | | |
| | RG21 | | | a2,3 | a10,11 | a18,19 | b1,2 | b9,10 | b17,18 | c0,1 | c8,9 | c16,17 | d0 | d7,8 | |
| | O_AD22 | | | | | | | | | | | | | | |
| | O_AD23 | | | | | | | | | | | | | | |
| | RG22 | | | a4,5 | a12,13 | a20,21 | b3,4 | b11,12 | b19,20 | c2,3 | c10,11 | c18,19 | d1,2 | d9,10 | |
| | RG23 | | | a6,7 | a14,15 | a22,23 | b5,6 | b13,14 | b21,22 | c4,5 | c12,13 | c20,21 | d3,4 | d11,d12 | |
| ST3 | RG30 | | | | a0-3 | a8-11 | a16-19,24 | b0-2 | b7-10 | b15-18,23,24 | c0,1 | c6-9 | c14-17,22-24 | d0 | d5-8 |
| ST4 | RG31 | | | | a4-7 | a12-15 | a20-23 | b3-6 | b11-14 | b19-22 | c2-5 | c10-13 | c18-21 | d1-4 | d9-12 |
| ST5 | RG40 | | | | | a0-7 | a8-15 | a16-24 | b0-6 | b7-14 | b15-24 | c0-5 | c6-13 | | d0-4 |
| | RG50 | | | | | | a0-7 | a0-15 | a0-24 | b0-6 | b0-14 | b0-24 | c0-5 | c0-13 | c0-24 |
| | Result | 0 | 0 | 0 | 0 | 0 | a0-7 | a0-15 | A0-24 | b0-6 | b0-14 | B0-24 | c0-5 | c0-13 | 0 |

FIG. 17

| | CYCLE | 1 | 2 | 3 | 4 | 5 | 6 | 7 | 8 | 9 |
|---|---|---|---|---|---|---|---|---|---|---|
| ST0 | RG00 | a0 | a8 | b5 | c2 | c10 | d7 | | | |
| | RG01 | a1 | a9 | b6 | c3 | d0 | d8 | | | |
| | RG02 | a2 | a10 | b7 | c4 | d1 | d9 | | | |
| | RG03 | a3 | b0 | b8 | c5 | d2 | d10 | | | |
| | RG04 | a4 | b1 | b9 | c6 | d3 | e0 | | | |
| | RG05 | a5 | b2 | b10 | c7 | d4 | e1 | | | |
| | RG06 | a6 | b3 | c0 | c8 | d5 | e2 | | | |
| | RG07 | a7 | b4 | c1 | c9 | d6 | e3 | | | |
| ST1 | RG10 | | a0 | a8 | b5 | c2 | c10 | | | |
| | RG11 | | a1 | a9 | b6 | c3 | d0 | | | |
| | RG12 | | a2 | a10 | b7 | c4 | d1 | | | |
| | RG13 | | a3 | b0 | b8 | c5 | d2 | | | |
| | RG14 | | a4 | b1 | b9 | c6 | d3 | | | |
| | RG15 | | a5 | b2 | b10 | c7 | d4 | | | |
| | RG16 | | a6 | b3 | c0 | c8 | d5 | | | |
| | RG17 | | a7 | b4 | c1 | c9 | d6 | | | |
| ST2 | O_AD20 | | | | a8,9 | b5,6 | | | | |
| | O_AD21 | | | | a10 | b7,8 | | | | |
| | RG20 | | | a0,1 | b0 | | | | | |
| | RG21 | | | a2,3 | | b9,10 | | d0 | | |
| | O_AD22 | | | | | | c2,3 | d1,2 | | |
| | O_AD23 | | | | | | c4,5 | | | |
| | RG22 | | | a4,5 | b1,2 | | c6,7 | d3,4 | | |
| | RG23 | | | a6,7 | b3,4 | c0,1 | c8,9 | d5,6 | | |
| ST3 | RG30 | | | | a8-10 | b0,5-8 | | c10 | | |
| | RG31 | | | | a0-3 | b1-4, 9,10 | c0,1 | c2-5 | | |
| | | | | | a4-7 | | | c6-9 | | |
| ST4 | RG40 | | | | | a0-10 | b0-10 | c0,1 | c2-10 | c0-10 |
| ST5 | RG50 | | | | | | a0-10 | b0-10 | c0,1 | c0-10 |
| | Result | | | | | | a0-10 | b0-10 | | |

FIG. 21
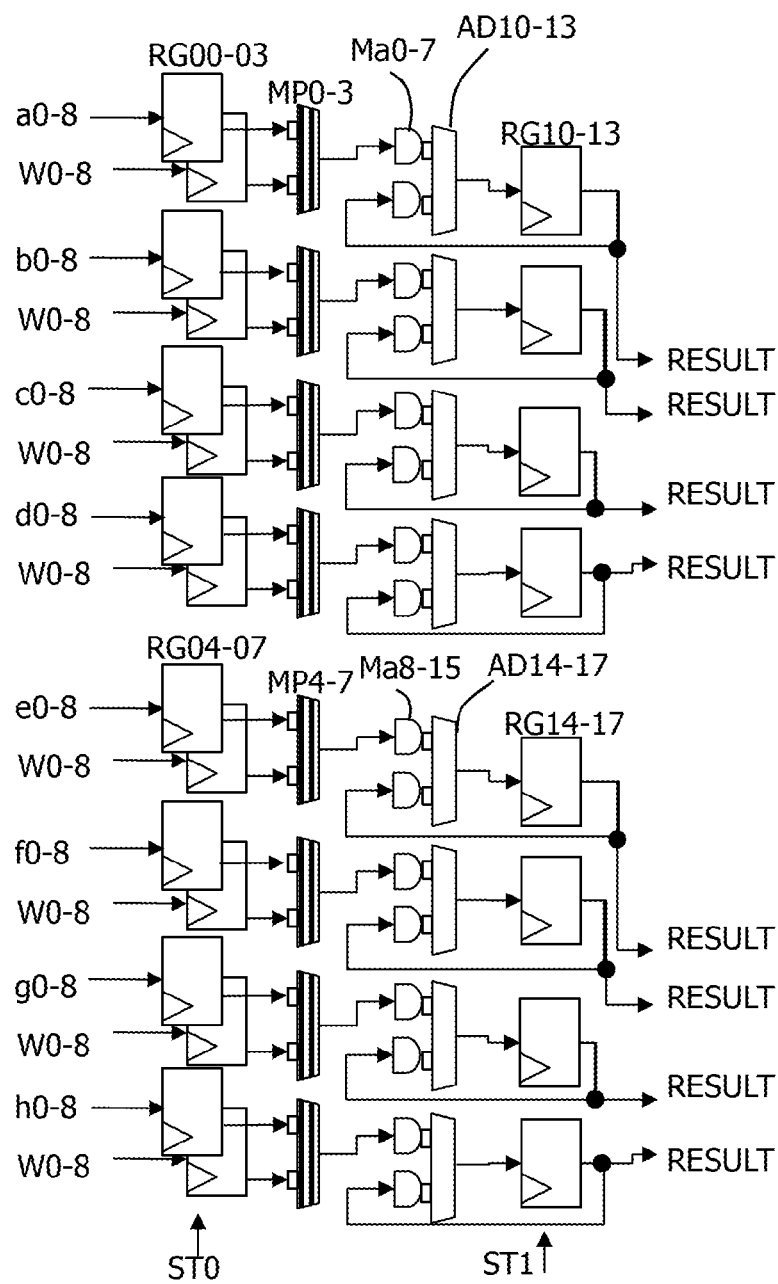
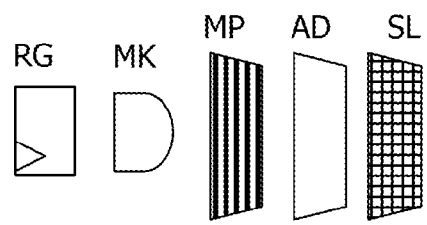

PROCESSOR, INFORMATION PROCESSING APPARATUS AND OPERATION METHOD FOR PROCESSOR

CROSS-REFERENCE TO RELATED APPLICATION

This application is a continuation application of International Application PCT/JP2018/000279 filed on Jan. 10, 2018 and designated the U.S., the entire contents of which are incorporated herein by reference. The International Application PCT/JP2018/000279 is based upon and claims the benefit of priority of the prior Japanese Patent Application No. 2017-013396, filed on Jan. 27, 2017, the entire contents of which are incorporated herein by reference.

FIELD

The embodiments discussed herein are related to a processor, an information processing apparatus and an operation method for a processor.

BACKGROUND

Deep learning (hereinafter referred to as DL: Deep Learning) is executed by an arithmetic operation process of a processor in an information processing apparatus. The DL is a general term of algorithms for which a neural network having a deep hierarchy (hereinafter referred to as DNN: Deep Neural Network) is utilized. Among such DNNs, a convolution neural network (CNN: Convolution Neural Network) is often utilized. The CNN is widely utilized, for example, as a DNN that decides a characteristic of image data.

The CNN that decides a characteristic of image data receives image data as an input thereto and performs convolution operation utilizing a filter to detect a characteristic (for example, a characteristic of an edge or the like) of the image data. Then, the convolution operation of the CNN is performed, for example, by a processor. A data format of a memory and an execution performance of an arithmetic unit are disclosed in the patent document mentioned below.

Example of the related art includes Japanese Laid-open Patent Publication No. 2014-38624.

SUMMARY

According to an aspect of the embodiments, a processor includes: a plurality of processor cores; and an internal memory configured to be accessed from the plurality of processor cores, wherein an arithmetic circuit provided in any of the plurality of processor cores includes: a plurality of first registers provided in a first stage of the arithmetic circuit, a regular addition circuit including a first adder and a second register, the first adder being configured to add a plurality of outputs of the plurality of first registers, the second register being configured to be provided in a second stage and latch an output of the first adder, an overtaking addition circuit including a second adder, the second adder being configured to add a plurality of outputs of the plurality of first registers, and a synthesis circuit including a third adder and a third register, the third adder being configured to add an output of the regular addition circuit and an output of the overtaking addition circuit, the third register being provided in a third stage of the arithmetic unit and being configured to latch an output of the second adder, wherein each of the first adder and the second adder is configured to exclusively select and receive a plurality of outputs of the plurality of first registers as inputs thereto, and wherein each of the first, second and third registers is configured to latch the inputs thereto in synchronism with a clock.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 depicts an example in which data of a structure of array (SOA: Structure Of Array) in which an AOS that is an array of a data structure to be stored into a memory is transposed is inputted to four arithmetic units;

FIG. 14 depicts operation of the product sum operation unit of FIG. 13 in a case of a 3×3 filter;

FIG. 15 depicts a selection or non-selection state of masks in a case of a 3×3 filter;

FIG. 16 depicts operation of the product sum operation unit of FIG. 13 in a case of a 5×5 filter;

FIG. 17 depicts operation of a product sum operation unit in a case where one set of input pixel data is 11 pixels;

FIG. 21 depicts the product sum operation unit of FIG. 20 in a case of second arithmetic operation.

DESCRIPTION OF EMBODIMENTS

In the convolution operation described above, while the position in image data of the coefficient filter is moved in a raster scan direction of the image data, product sum operation between pixel data of a neighborhood matrix centered at a noticed pixel of image data and coefficients (weights) of a coefficient filter is repetitively performed. The size of the coefficient filter is substantially equal to the square of an odd number (value obtained by adding 1 to a multiple of 8). For example, there are 3>3, 5×5, 7×7, 9×9, 11×11 and so forth.

On the other hand, the convolution operation is repetitions of product sum operation and is preferably processed in parallel by a plurality of product sum operation units. Further, in DNN, convolution operation is sometimes performed for image data in a plurality of channels (pixel data of a plurality of planes), and also in this case, it is desirable to perform parallel processing by a plurality of product sum operation units.

Incidentally, a processor includes the number of arithmetic operators substantially equal to the power of 2. Therefore, for example, if nine coefficients or pixel data in the case of a 3×3 coefficient filter are inputted to 16 arithmetic units, part of the arithmetic operators sometimes fails to process product sum operation, and as a result, 16 arithmetic units are not operated efficiently.

Therefore, image data are transformed such that a plurality of sets of pixel data and coefficients are inputted in parallel to 16 arithmetic units. However, in this case, since a process for transposing the image data is required and operation of the arithmetic units is stopped during execution of the transposition process, the 16 arithmetic units are not operated efficiently.

Therefore, the present disclosure provides a processor, an information processing apparatus and an operation method for a processor by which arithmetic operation is performed efficiently. With a first aspect of the present disclosure, arithmetic operation may be performed efficiently.

Figure 1:
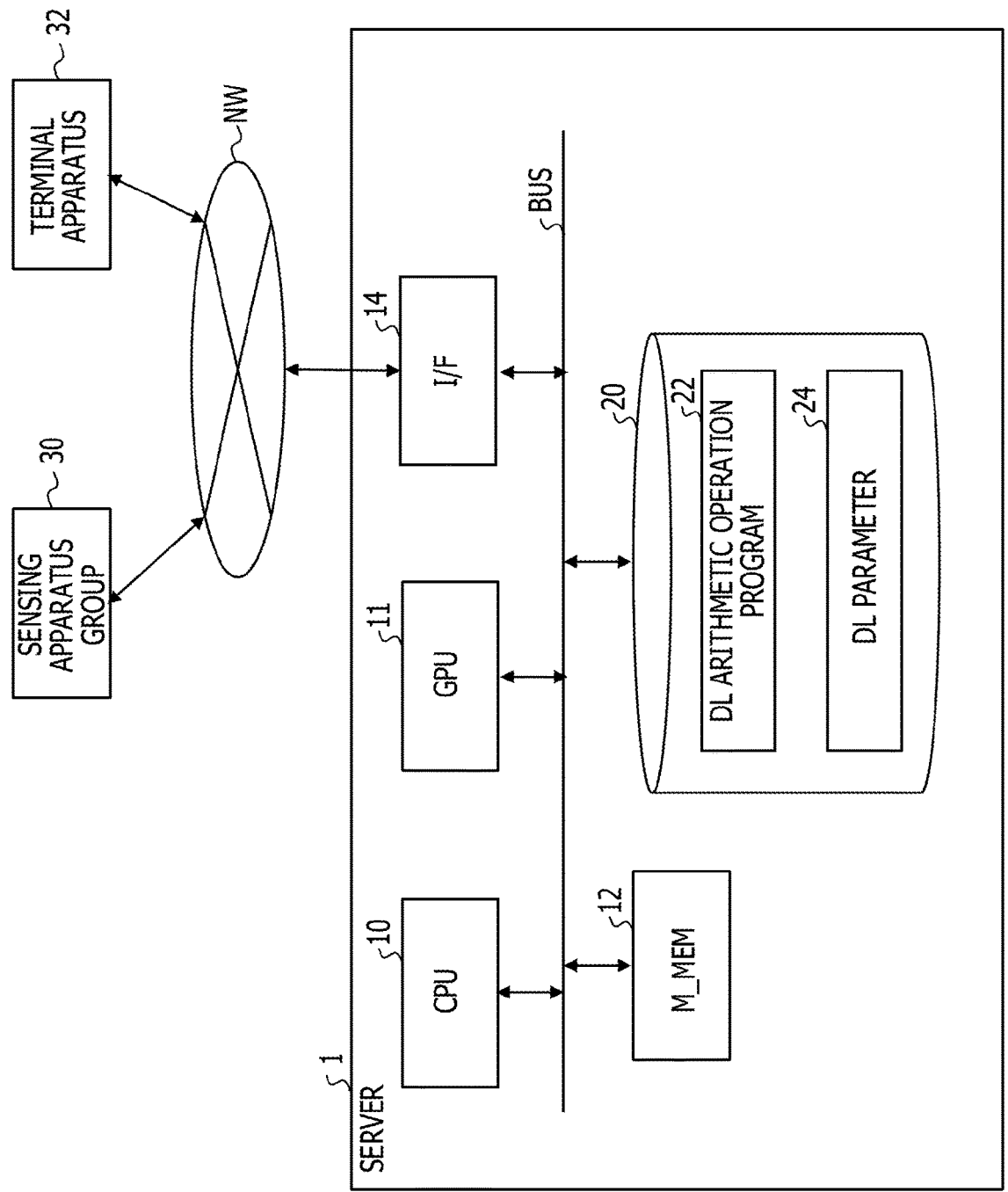
FIG. 1 depicts a configuration of an information processing apparatus (deep learning server) that executes deep learning according to an embodiment.

FIG. 1 is a view depicting a configuration of an information processing apparatus (deep learning server) that executes deep learning in the present embodiment. A server 1 may communicate with a censing apparatus group 30 and a terminal apparatus 32 through a network. For example, the censing apparatus group 30 picks up an image by an image pickup device to generate image data and transmits the image data to the server 1. The terminal apparatus 32 receives and outputs a result of the decision of a characteristic of the image data from the server 1.

The server 1 includes a central processing unit (CPU) 10 that is a general-purpose processor and a graphic processing unit (GPU) 11 that is a graphic processor. The server 1 further includes a main memory 12 such as a dynamic random access memory (DRAM), a network interface 14 such as a network interface card (NIC), an auxiliary memory 20 having a large capacity such as a hard disk or a solid storage device (SSD) and a bus BUS for coupling the components.

The auxiliary memory 20 stores a deep learning arithmetic operation program 22, deep learning parameters 24 and so forth. The auxiliary memory 20 stores also an operating system (OS) not depicted, various middleware programs and so forth in addition to the program and parameters. The processor 10 and the graphic processor 11 deploy the program or the parameters described above in the main memory 12 and execute the program based on the parameters.

Figure 2:
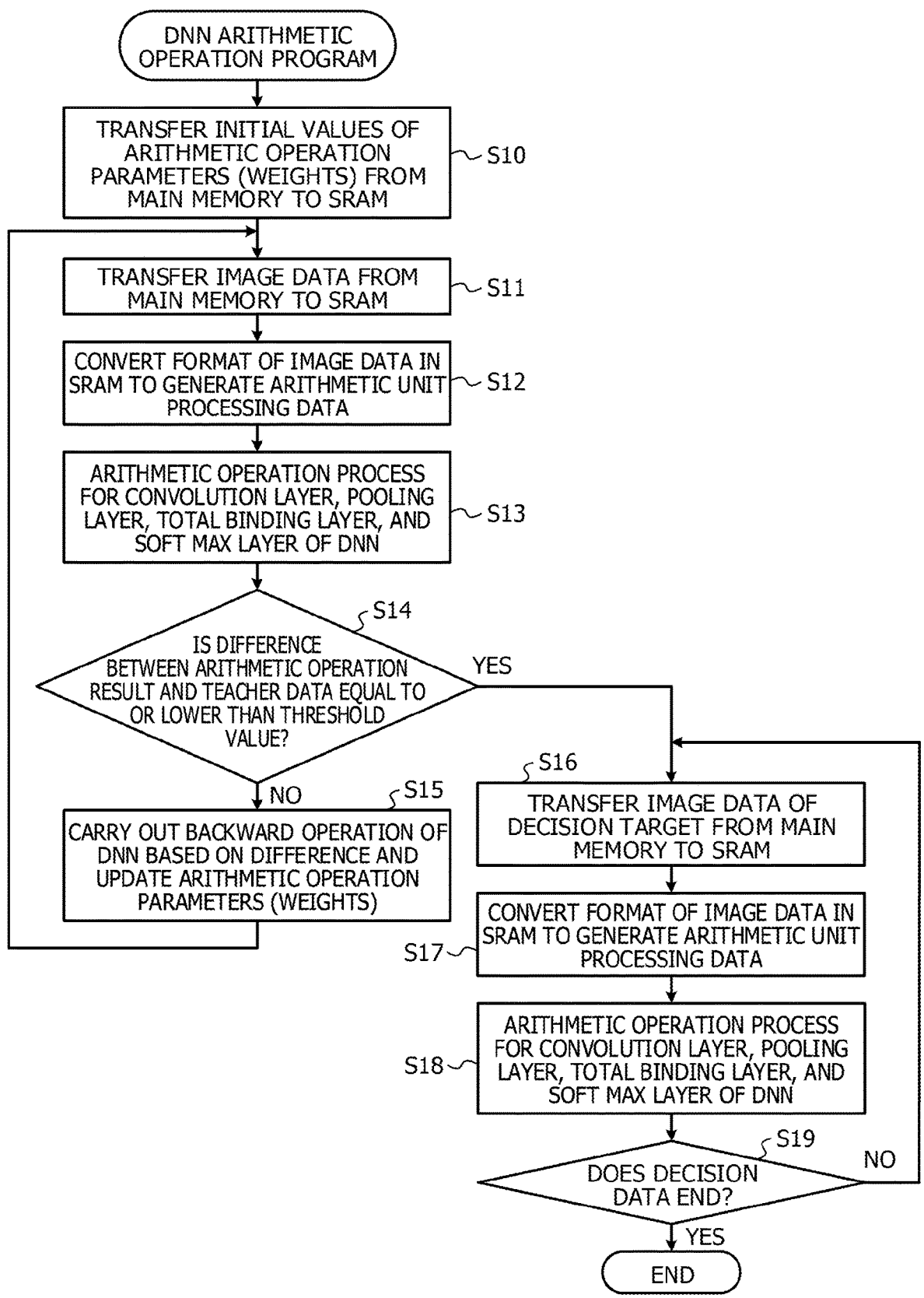
FIG. 2 illustrates a schematic process of a deep learning arithmetic operation program.

FIG. 2 is a flow chart illustrating a schematic process of a deep learning arithmetic operation program. The DL arithmetic operation program is, for example, a program for executing arithmetic operation of a DNN. The processors 10 and 11 execute the DL arithmetic operation program to execute processes of a learning mode and a decision mode. The DL is described taking a DNN for deciding a characteristic of image data as an example.

In the learning mode, the processors 10 and 11 read out initial values of arithmetic operation parameters (coefficients (weights) of a filter and so forth) from the main memory 12 and write the read out initial values into a high-speed memory SRAM in the processor 11 (S10). Further, the processors read out image data transmitted from the censing apparatus group 30 from the main memory 12 and write the read out data into the high-speed memory SRAM (S11). Then, the processors perform format conversion for the image data to generate neighborhood matrix image data (arithmetic operation processing data) for inputting to a arithmetic unit (S12), and perform an arithmetic operation process of a convolution layer, a pooling layer, a total binding layer and a soft max layer (outputting layer) of the DNN (S13). This arithmetic operation is performed for each of a given number of image data. A result of the arithmetic operation indicates, for example, a number 0 or 1 of the image data.

Further, the processors 10 and 11 decide whether or not the difference between the result of the arithmetic operation and teacher data that is correct data of the image data is equal to or lower than a threshold value (S14). In the case where the difference is not equal to or lower than the threshold value (NO at S14), backward arithmetic operation of the DNN is executed based on the difference of the arithmetic operation parameters to update the arithmetic parameters (S15). Then, the processes S11 to S13 described above are repetitively performed with the updated arithmetic operation parameters. Here, the difference between the arithmetic operation result and the teacher data is, for example, a total value of differences between 1000 results of arithmetic operation performed in regard to 1000 image data and 1000 teacher data or the like.

When the difference described above becomes equal to or lower than the threshold value (YES at S14), it is decided that the arithmetic operation parameters are individually set to an optimum value and then the learning mode is ended. Then, the arithmetic operation process in the decision mode is performed in accordance with the optimum value of the arithmetic operation parameters.

In the decision mode, the processors 10 and 11 read out image data of a decision target from the main memory (S16) and perform format conversion for the image data to generate neighborhood matrix image data for inputting to an operation unit (S17), and perform arithmetic operation processes of a convolution layer, a pooling layer, a total binding layer and a soft max layer (outputting layer) of the DNN (S18). The processors 10 and 11 repetitively perform the decision process described above until the decision process relating to the image data of the decision target comes to an end (S19). The result of the decision is transmitted to and outputted from the terminal apparatus 32.

Figure 3:
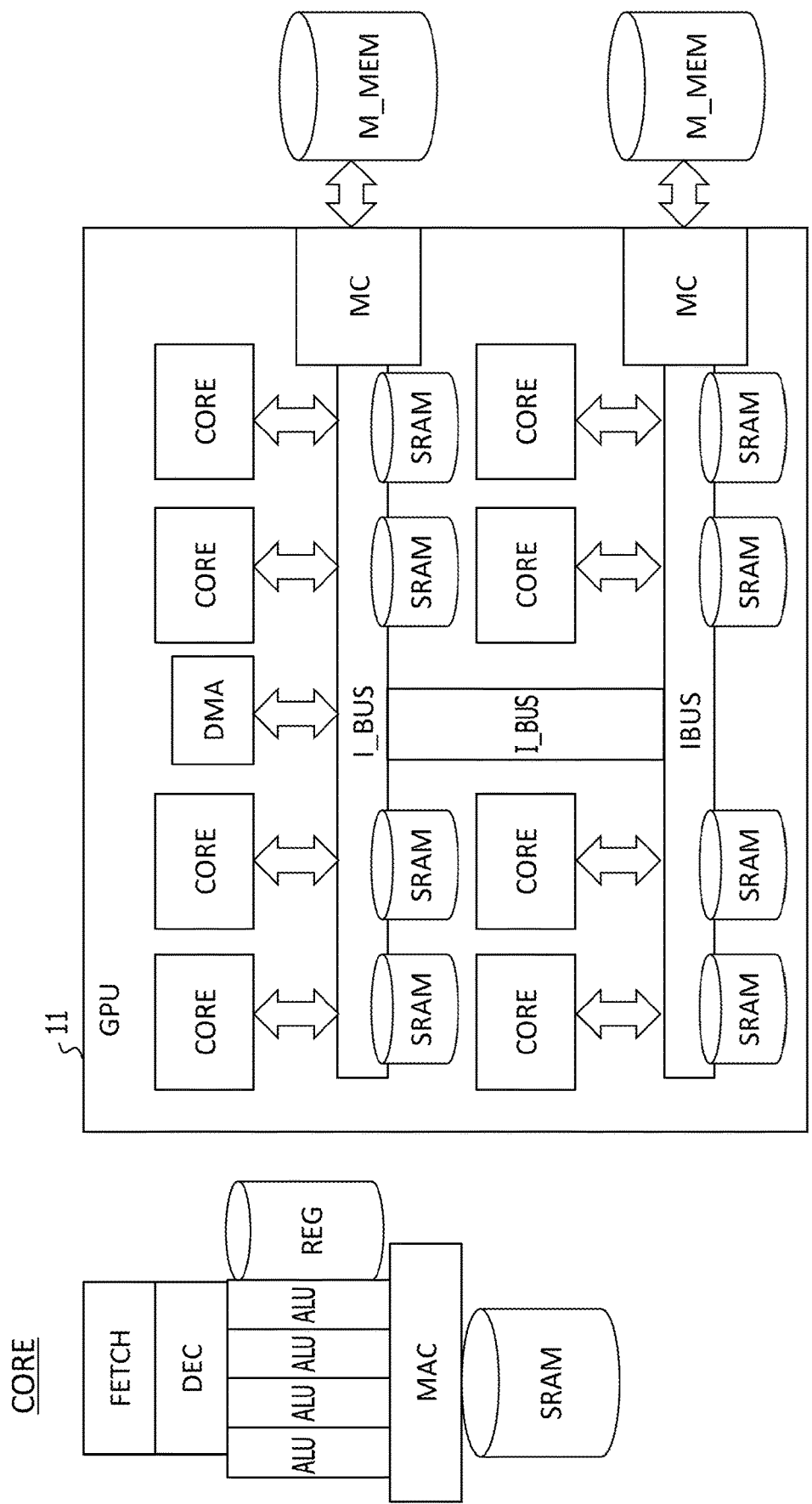
FIG. 3 depicts a configuration of a graphic processor (GPU) and a configuration of a core in the GPU.

FIG. 3 is a view depicting a configuration of the graphic processor (GPU) 11 and a configuration of a core CORE in the GPU. The GPU 11 may access a main memory M_MEM. The GPU 11 includes, for example, eight processor cores CORE, a plurality of high-speed memories SRAM disposed corresponding to the processor cores CORE, an internal bus I_BUS and a memory controller MC that performs access control to the main memory M_MEM. The GPU 11 includes an L1 cache memory in each core CORE, an L2 cache memory shared by the eight cores CORE and various peripheral resource circuits, which are not depicted in FIG. 3. Further, the GPU 11 includes a direct memory access controlling circuit DMA that controls data transfer between internal high-speed memories SRAM, data transfer between the main memory M_MEM and the high-speed memories SRAM and so forth.

On the other hand, similarly to a normal processor core, each of the processor cores CORE includes an instruction fetch circuit FETCH that acquires an instruction from the memory, a decoder DEC that decodes the acquired instruction, a plurality of arithmetic units ALU and a register group REG therefor that perform arithmetic operation of the instruction based on a result of the decoding and a memory access controlling circuit MAC that accesses the high-speed memory SRAM.

The GPU 11 is a DL apparatus of the present embodiment implemented, for example, by a semiconductor chip. The GPU 11 reads out image data from the main memory M_MEM that stores image data transmitted from the sensing apparatus group described above and writes the read out image data into an internal high-speed memory SRAM. Then, the operation unit ALU in each core CORE receives the image data written in the SRAM as an input thereto and executes an arithmetic operation process in each layer of the DNN to generate an output of the DNN.

Figure 4:
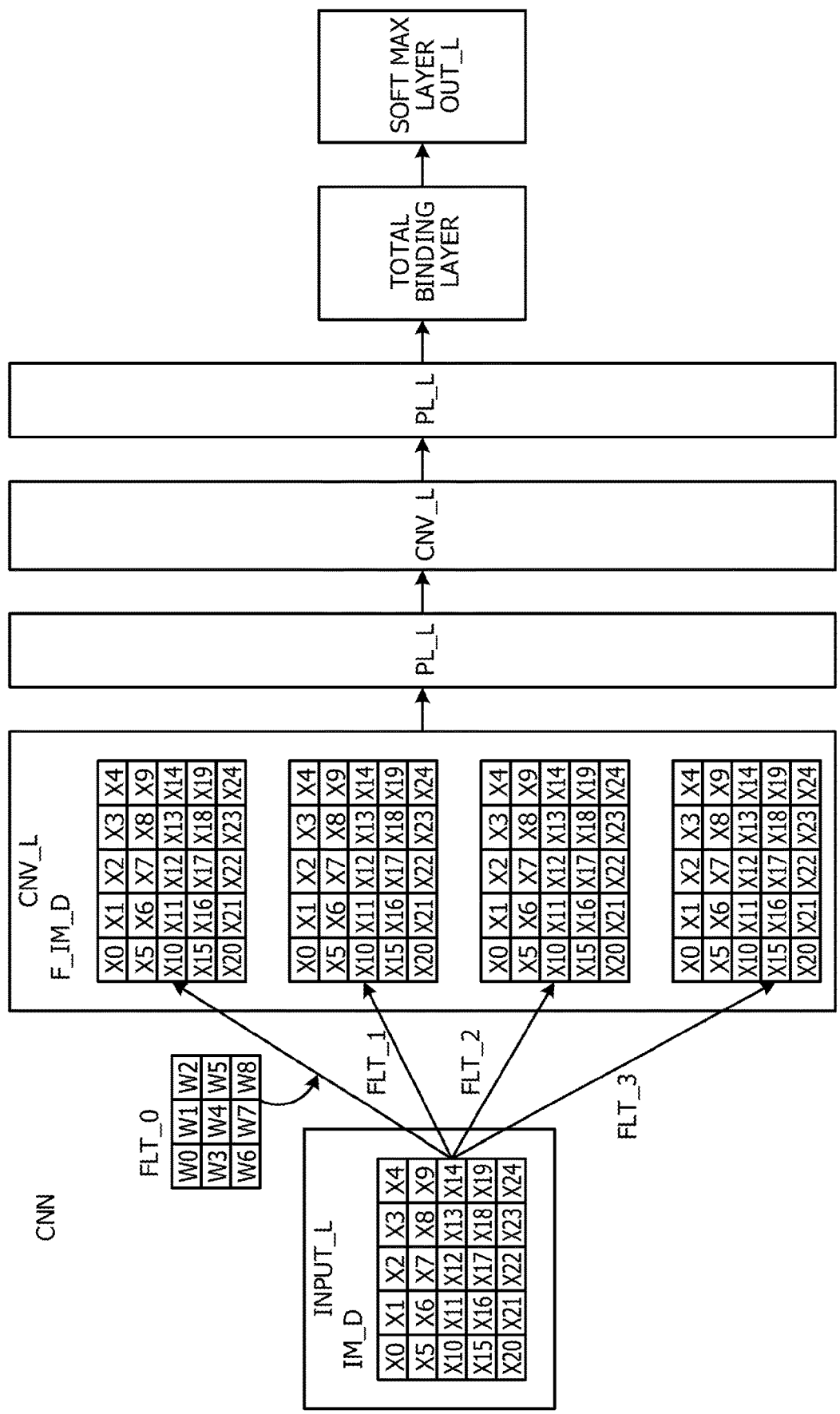
FIG. 4 depicts an example of a DNN.

FIG. 4 is a view depicting an example of a CNN. The CNN that performs a decision process of image data includes an inputting layer INPUT_L to which image data IM_D that is input data is inputted, a plurality of sets of convolution layers CNV_L and pooling layers PL_L, a total binding layer C_L and a soft max layer (outputting layer) OUT_L.

Each convolution layer CNV_L performs filtering for the image data IM_D by a coefficient filter FLT to generate image data F_IM_D having a certain characteristic amount. If the filtering is performed using a plurality of coefficient filters FLT_0-3, image data F_IM_D individually having characteristic amounts are generated. Each pooling layer PL_L selects, for example, a representative value (for example, a maximum value) of values of nodes of the convolution layer. Then, for example, a result of the decision of a number within the image data (one of 0 to 9) is outputted to the outputting layer OUT_L as described above.

The convolution layer CNV_L performs product sum operation for multiplexing pixel data of, for example, a 3×3 neighborhood matrix of the image data IM_D having pixel data of a M×N two-dimensional pixel matrix and coefficient data of a 3×3 coefficient filter FLT substantially equal to that of the neighborhood matrixes and adding results of the multiplexing to generate pixel data F_IM_D of a noticed pixel centered at the neighborhood matrix. Arithmetic operation in the filtering process is performed for all pixels of the image data IM_D while the coefficient filter is successively displaced in a raster scanning direction of the image data IM_D. This is convolution operation.

Figure 5:
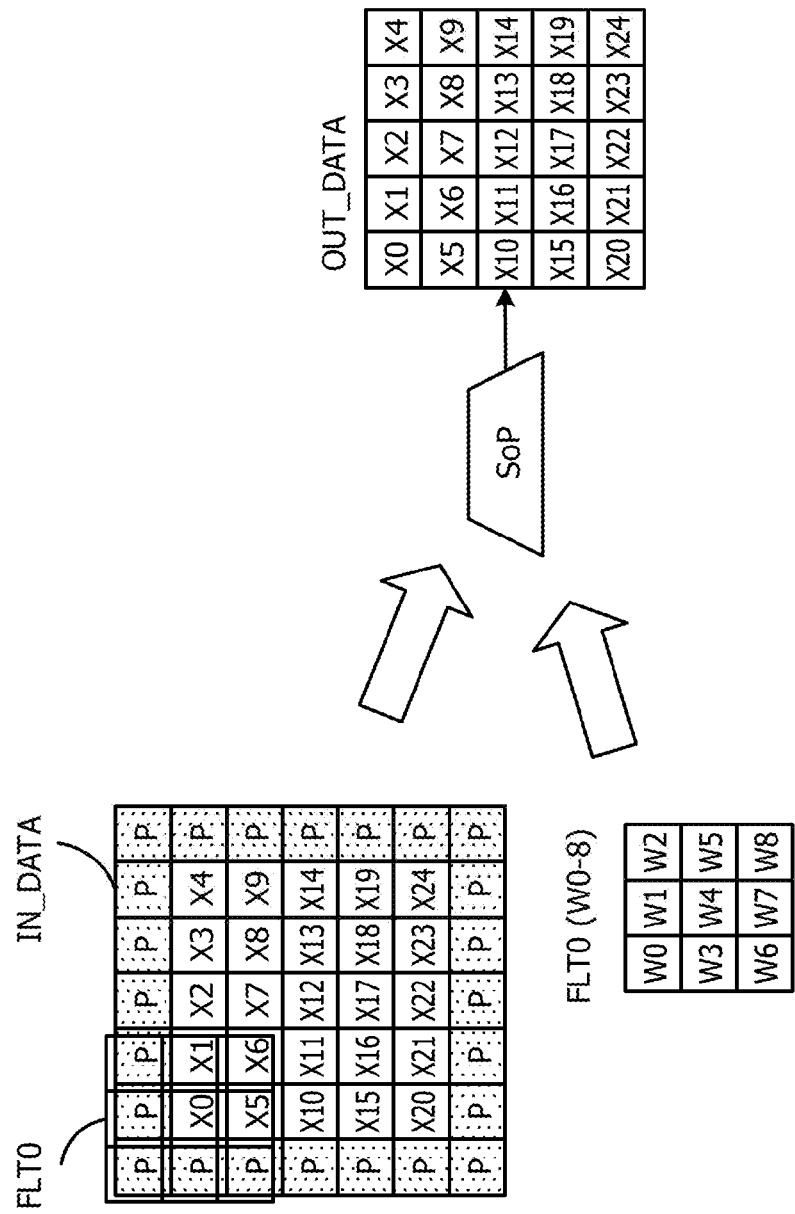
FIG. 5 illustrates convolution operation.

FIG. 5 is a view illustrating convolution operation. In FIG. 5, for example, input image data IN_DATA in which padding P is added to the periphery of 5×5 image data, a coefficient filter FLT0 having weights W0 to W8 in 3 rows and 3 columns and output image data OUT_DATA after the convolution operation are depicted. In the convolution operation, product sum operation of multiplying a plurality of pixel data of the neighborhood matrix centered at the noticed pixel and a plurality of coefficients (weights) W0 to W8 of the coefficient filter FLT0 and adding the products is repetitively performed while the coefficient filter FLT0 is successively displaced in a raster scanning direction of the image data.

Where the pixel data of the neighborhood matrix are Xi (where i=0 to 8) and the coefficient data of the coefficient filter are Wi (where i=0 to 8), a product sum operation expression is such as given below.

$$Xi = \Sigma(Xi * Wi) \qquad (1)$$

where Xi on the right side is image data of the input image IN_DATA, Wi is a coefficient and $\Sigma$ indicates addition of i=0 to 8 while Xi on the left side indicates a product sum operation value and is pixel data of the output image OUT_DATA.

For example, in the case where the noticed pixel of the image data is X6, the pixel data X6 obtained by the product sum operation SoP in accordance with the expression (1) is such as given below:

$$X6 = X0*W0 + X1*W1 + X2*W2 + X5*W3 + X6*W4 + X7*W5 + X10*W6 + X11*W7 + X12*W8$$

Figure 6:
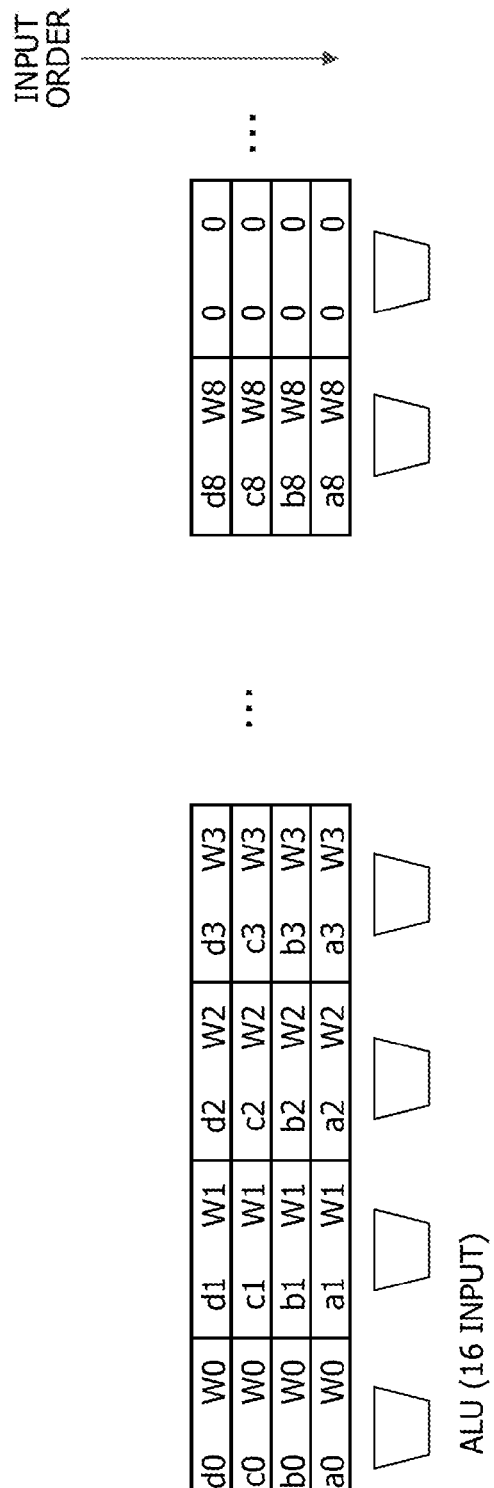
FIG. 6 depicts an example in which an array of a data structure (AOS: Array Of Structure) to be stored into a memory is inputted to 16 arithmetic units.

FIG. 6 is a view depicting an example in which an array of a data structure (AOS: Array Of Structure) stored in a memory is inputted to 16 arithmetic units. In the example of FIG. 6, input data IN_DATA include input image data IN_DATA of 16 words for each row of the array of structure (AOS) format and coefficients FLT (W0 to W8) of 16 words and are inputted to 16 arithmetic units ALU in order of rows.

In the input image data IN_DATA, pixel data a0 to a8, b0 to b8, c0 to c8 and d0 to d8 are packed to the first 9 words in each row, and pixel data of the value "0" are packed in the remaining 7 words. Also in regard to the coefficient filters FLT, coefficient data W0 to W8 are packed in the first 9 words and the value "0" is packed in the remaining 7 words in one row. Then, pixel data and coefficient data of individually corresponding columns are inputted in pair to 16 inputs of the arithmetic units ALU.

In this case, although arithmetic units of the nine inputs from among the arithmetic units perform arithmetic operation for valid input data, since the arithmetic units of the remaining 7 inputs receive invalid input data as inputs thereto, they do not perform valid arithmetic operation.

FIG. 7 is a view depicting an example in which data of a structure of array (SOA: Structure Of Array) in which the AOS that is an array of a data structure stored in a memory is transposed are inputted to four arithmetic units. The input data IN_DATA and the coefficient data W0 to W8 of the coefficient filters FLT are same as those in FIG. 6. Transposed data TRSP_DATA obtained by inverting the input data IN_DATA in the column direction and the row direction by a transposition process are inputted in pair with coefficient data to the four arithmetic units ALU.

In this case, all of the four arithmetic units receive valid input data as inputs thereto and perform arithmetic operation with the input data. Accordingly, all arithmetic units perform valid arithmetic operation, and therefore, the arithmetic operation efficiency may be increased. However, the four arithmetic units are not allowed to start an arithmetic operation process until after the transposition process of input data is completed, which deteriorates the arithmetic operation efficiency.

First Embodiment

Figures 8A, 8B, 8C:
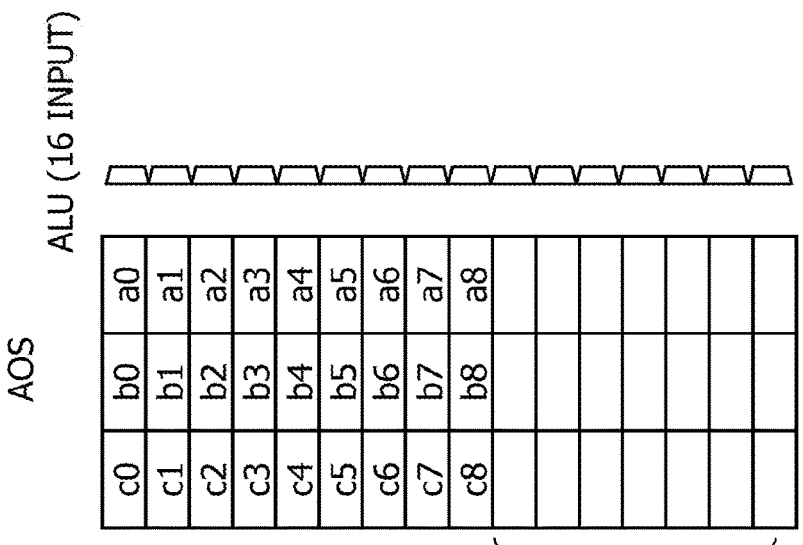
FIGS. 8A to 8C are views depicting a configuration of input data to an arithmetic unit according to the present embodiment in contrast to examples of FIGS. 6 and 7.

FIGS. 8A to 8C are views depicting a configuration of input data to arithmetic units in the present embodiment in contrast to the examples of FIGS. 6 and 7. The configurations AOS and SOA of the input data depicted in FIGS. 6 and 7 are depicted in FIGS. 8B and 8C, respectively. In FIGS. 8A to 8C, from within data inputted to the arithmetic units, only input data IN_DATA are depicted while coefficients of filters are omitted for the simplified illustration.

In FIG. 8B, different from FIG. 6, 16 inputs to the arithmetic units ALU are depicted lined up in the vertical direction on the right side. Further, in FIG. 8C, different from FIG. 7, 16 arithmetic units ALU are depicted lined up in the vertical direction on the right side. In the case of the input data of FIG. 8B, since the format of the input data is the AOS, the arithmetic units ALU of seven inputs from among the 16 inputs do not operate. On the other hand, in the case of the input data of FIG. 8C, since the format of the input data is SOA, the 16 arithmetic units ALU fully operate. However, for the object of formatting to the SOA, a transposition process is required, and operation a cycle of processing of the arithmetic units stops till starting of arithmetic operation.

In contrast, FIG. 8A depicts the configuration of input data and four arithmetic units of the present embodiment. In this case, to the eight inputs of the arithmetic units ALU, nine pixel data a0 to a8 are inputted with an 8-word width. Therefore, in the first eight word inputs, the eight pixel data a0 to a7 are included, and in the next 8 word inputs, the remaining pixel data a8 is included together with part b0 to b6 of the next nine pixel data.

Therefore, the arithmetic units ALU in the present embodiment receive the number of input data exceeding the number of inputs thereof as inputs thereto in a plurality of cycles, and output arithmetic operation results of all input data after the number of arithmetic operation cycles of the data inputted in the first cycle. For example, the arithmetic unit performs a pipeline process and output arithmetic operation results in a plurality of stages. The arithmetic units in the present embodiment have, in addition to an ordinary pipeline process route, an overtaking process route that includes a smaller number of stages than that of the ordinary pipeline process route. Then, arithmetic operation of input data that are not included in the first 8 word inputs is executed by the overtaking process route, and after the number of arithmetic operation circuits of the data inputted in the first cycle, the arithmetic operation results of all input data are outputted.

[Configuration of GPU]

Figure 9:
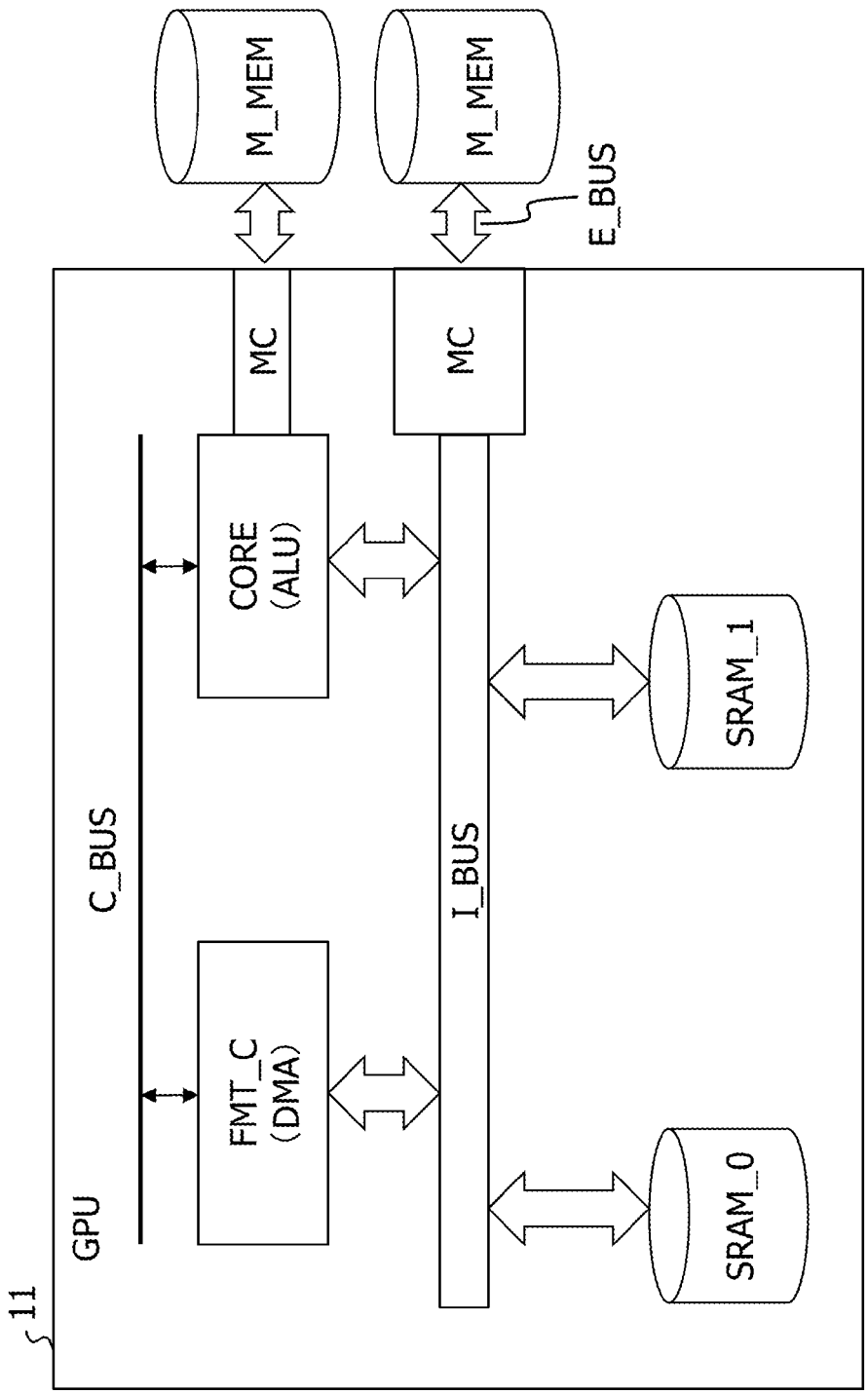
FIG. 9 depicts a configuration of a graphic processor (DL apparatus) according to the present embodiment.

FIG. 9 is a view depicting a configuration of a graphic processor, for example, a GPU (DL apparatus) in the present embodiment. The GPU of FIG. 9 depicts a configuration simplified from the configuration of FIG. 3. The GPU is a DL chip (DL apparatus) that performs DL arithmetic operation.

The GPU includes a processor core CORE, internal high-speed memories SRAM_0 and SRAM_1, an internal bus I_BUS, memory controllers MC, a format converter FMT_C for image data, and a control bus C_BUS. The format converter FMT_C converts the format of image data inputted from a main memory M_MEM into that of inputting neighborhood matrix input data for inputting the image data to an arithmetic unit in the core CORE. In the present embodiment, the format converter FMT_C is a DMA that executes data transfer between the high-speed memories SRAM_0 and SRAM_1. For example, the DMA includes a format converter in addition to an original data transfer circuit. However, the format converter may be configured solely independently of the DMA. Further, the DMA receives image data of the high-speed memory SRAM_0 as an input thereto, performs format conversion of the image data to generate neighborhood matrix image data and writes the generated neighborhood matrix image data into the other high-speed memory SRAM_1.

The processor core CORE has a built-in product sum operation unit. The product sum operation unit multiplies neighborhood matrix image data generated by the format converter and coefficient data of the coefficient filter and adds the products.

[Example of Format Conversion of Input Data]

Figure 10:
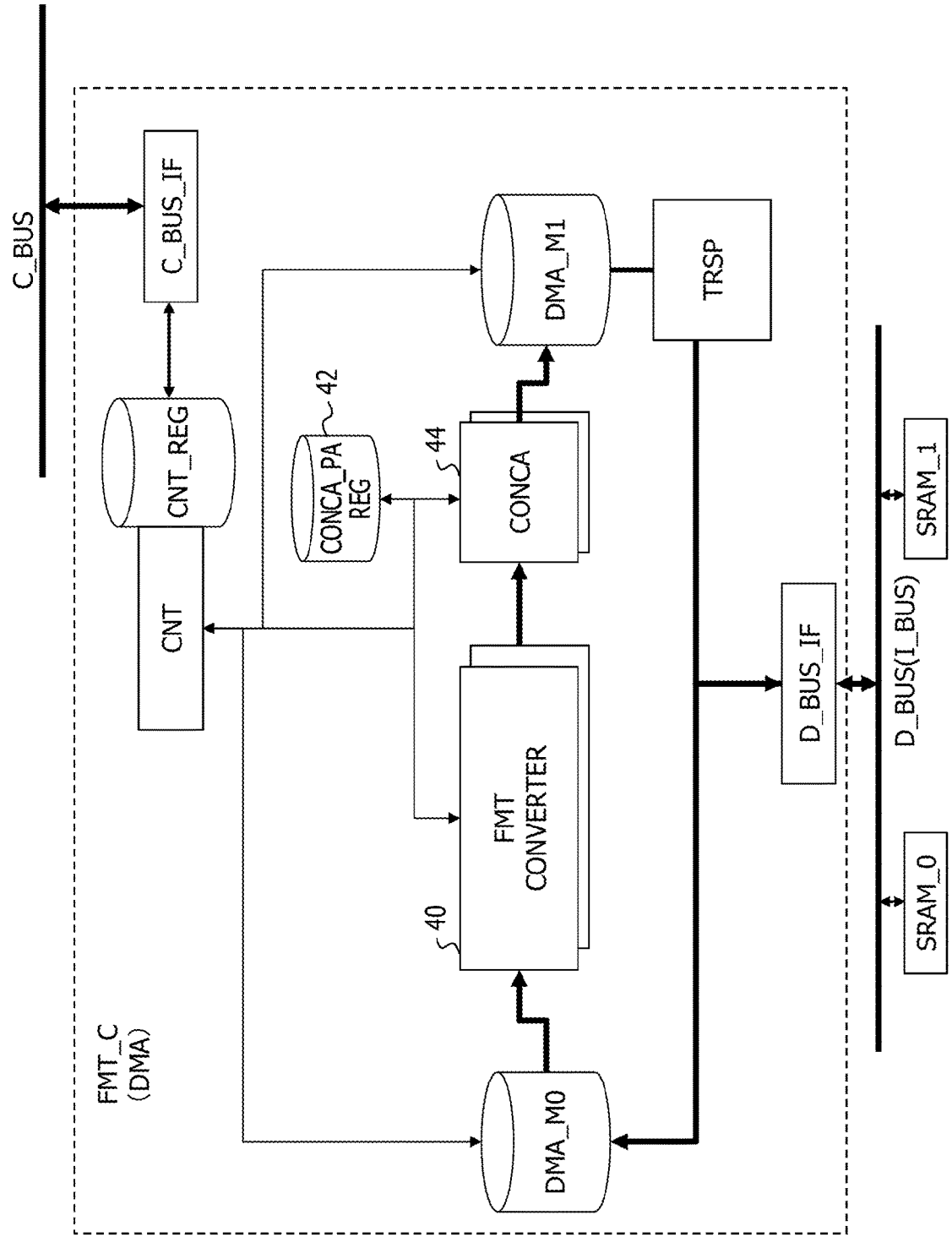
FIG. 10 depicts a configuration of a format converter.

FIG. 10 is a view depicting a configuration of the format converter FMT_C. The format converter FMT_C includes a control bus interface C_BUS_IF for the control bus C_BUS, a control data register CNT_REG for storing control data, and a control circuit CNT similar to a state machine. To the control bus C_BUS, control data is transferred from a core not depicted, and the control data is stored into a control register.

The control circuit CNT performs control of transfer of image data from the first high-speed memory SRAM_0 to the second high-speed memory SRAM_1. Further, in the case of format conversion of image data, the control circuit CNT performs setting of parameter values to a parameter register 42 and control of starting and ending of format conversion in addition to the transfer control of image data. For example, the control circuit CNT reads out image data from the first high-speed memory SRAM_0, performs format conversion of the image data and writes the image data after the format conversion into the second high-speed memory SRAM_1. In this manner, the control circuit CNT performs format conversion during data transfer of image data. When data transfer is to be performed, the control circuit CNT designates an address for the image data and performs access to the high-speed memories SRAM. Then, the control circuit CNT sets parameter values of the register for format conversion corresponding to the address for image data.

The format converter FMT_C further includes a first DMA memory DMA_M0, a second DMA memory DMA_M1, and a format conversion circuit 40 and a concatenation (coupling circuit) 44 interposed between the DMA memories DMA_0 and DMA_1. A plurality of sets of such format conversion circuits 40 and concatenations 44 are provided and perform format conversion of a plurality of sets of neighborhood matrix image data in parallel to each other. Further, the format converter FMT_C includes a coupling circuit parameter register 42 for setting parameters for the coupling circuits. The format converter FMT_C further includes a transposition circuit TRSP that performs transposition of image data and a data bus interface D_BUS_IF coupled to a data bus D_BUS of the internal bus I_BUS.

The core CORE in which the arithmetic units ALU are built reads out neighborhood matrix image data after format conversion stored in the second high-speed memory SRAM_1, and the product sum operation unit built therein executes convolution operation and writes characteristic amount data after the arithmetic operation back into the high speed memory.

Figure 11:
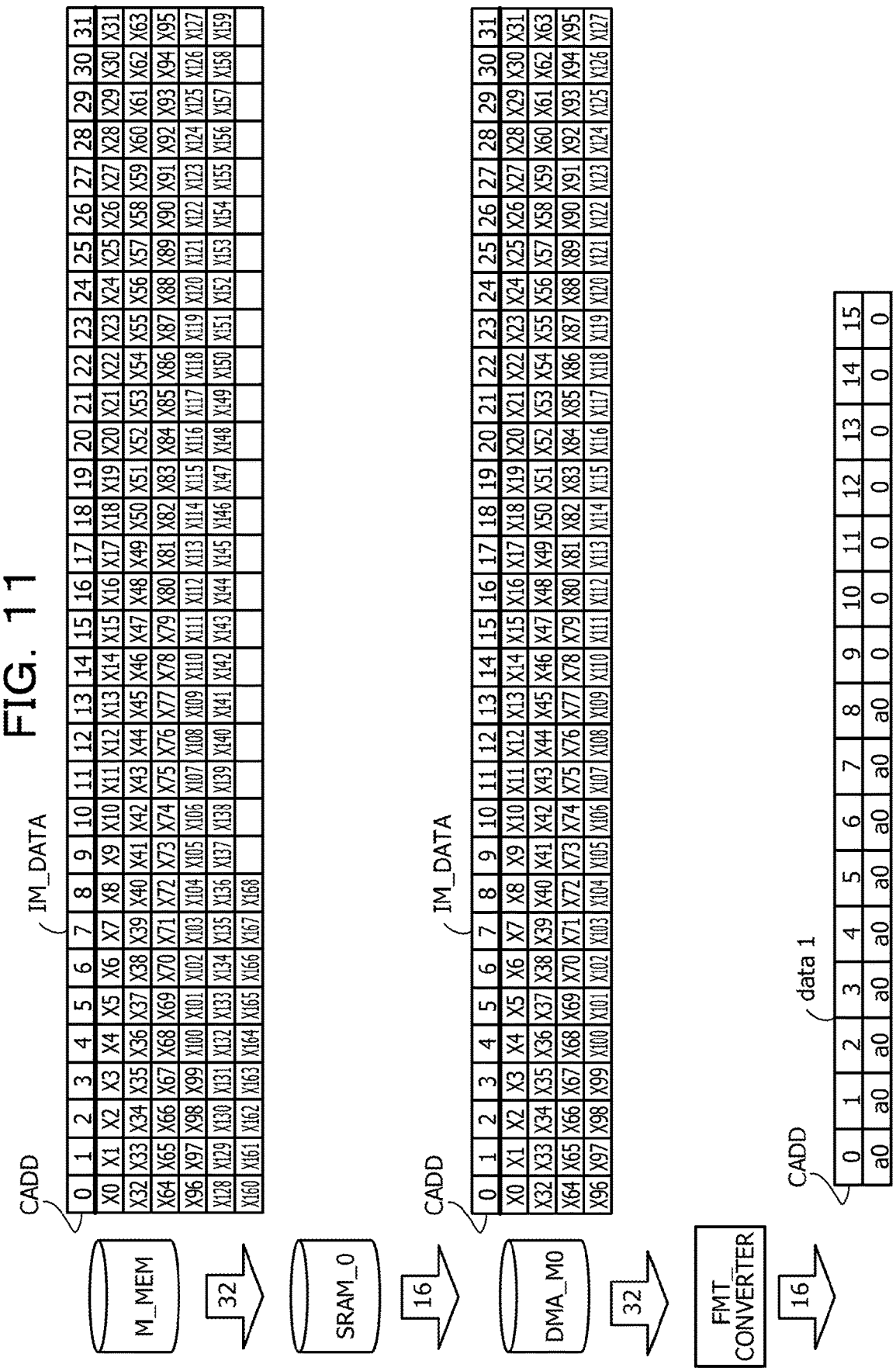
FIG. 11 depicts a first example of a generation procedure of image data of an inputting neighborhood matrix to be inputted to a product sum operation unit.
Figure 12:
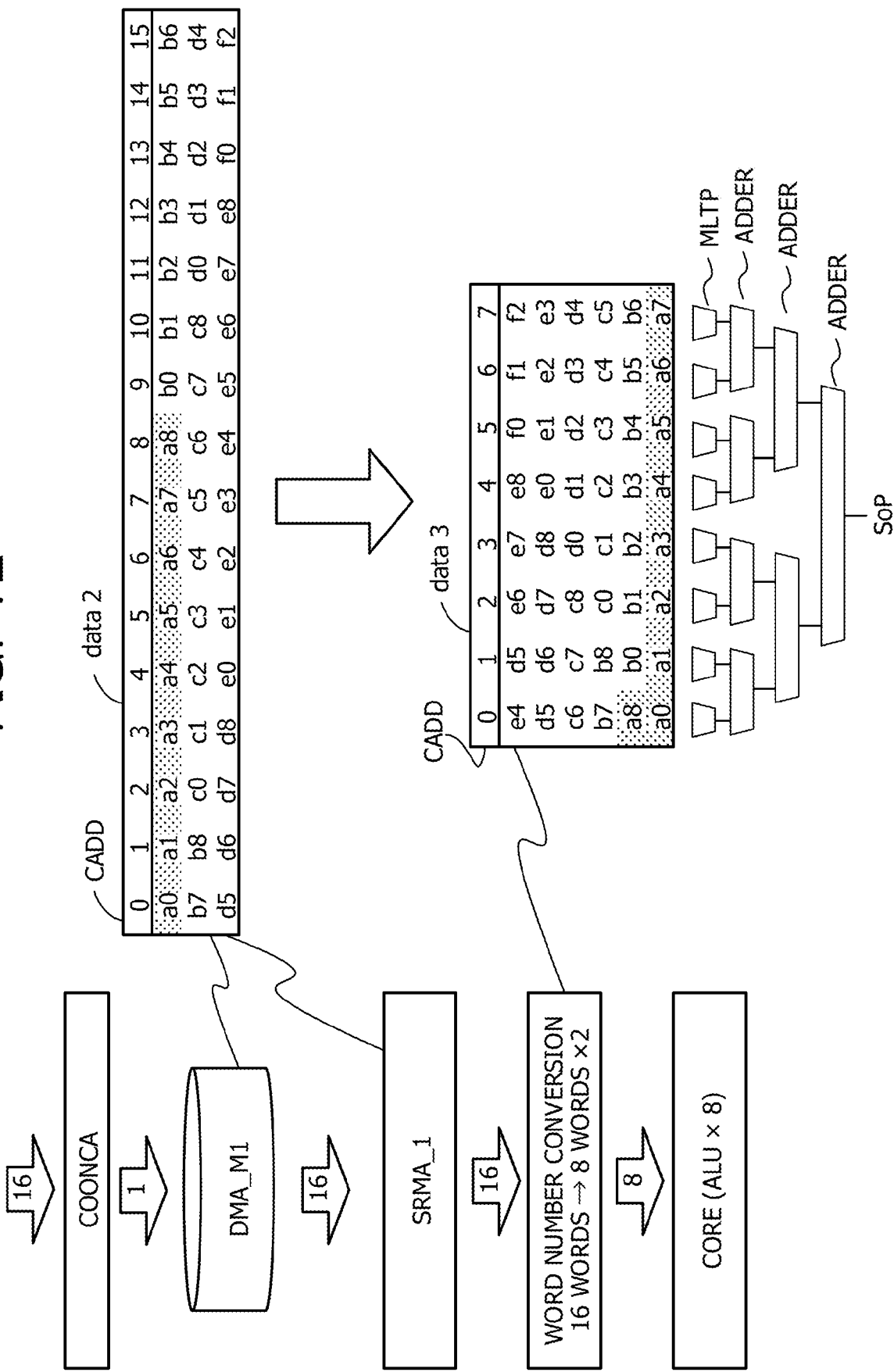
FIG. 12 depicts the first example of a generation procedure of image data of an inputting neighborhood matrix to be inputted to a product sum operation unit.

FIGS. 11 and 12 are views depicting a first example of a generation process of image data of an inputting neighborhood matrix to be inputted to a product sum operation unit. The main memory M_MEM stores image data IM_DATA of 13 rows and 13 columns with a 32-word width in one row. In the image data IM_DATA, 32 column addresses CADD (=0 to 31) are indicated. Meanwhile, the image data IM_DATA of 13 rows and 13 columns have pixel data X0 to X168 of 169 words.

First, the memory controller MC in the GPU reads out image data IM_DATA in the main memory M_MEM through an external bus of 32-word width, converts the image data of 32-word width into image data of 16-word width, and writes the image data of 16-word width into the first high-speed memory SRAM_0 through the internal bus I_BUS of 16-word width. This data transfer is performed, for example, by a standard data transfer function of the DMA.

Then, the DMA that is a format converter reads out the image data in the first high-speed memory SRAM_0 through the internal bus I_BUS and writes the image data into the first DMA memory DMA_M0. Then, the data format conversion circuit 40 extracts nine pixel data of a neighborhood matrix from the image data data0 in the first DMA memory DMA_M0 to generate data data1 of 16 words.

Then, as depicted in FIG. 12, a coupling circuit CONCA packs pixel data of 9 words of each one set from among eight sets of neighborhood matrix image data data2 in the raster scanning direction into the second DMA memory DMA_M1 of 16 words in one row. As a result, neighborhood matrix image data a0 to a8 of the first set are stored across the first row and the second row of the second DMA memory DMA_M1, and neighborhood matrix image data b0 to b8 of the second set are stored across the second row and the third row; and neighborhood matrix image data individually of 9 words of the third and succeeding sets are individually stored across two rows.

Then the control circuit CNT transfers the image data data2 packed from the neighborhood matrix image data in the second DMA memory DMA_M1 to the second high-speed memory SRAM_1 through the internal bus without performing a transposition process for the image data data2.

Then, the core CORE in the GPU reads out the neighborhood matrix image data data2 in the second high-speed memory SRAM_1 by each 16 words and converts each 16 words into 8 words to generate data data3. Then, the core CORE inputs the neighborhood matrix image data for each 8 words together with coefficients (W0 to W8) into eight multipliers MLTP of a first stage of a single product sum operation unit SoP provided in the core CORE. As a result, the product sum operation unit SoP multiplies the pixel data of the neighborhood matrixes of 9 words for each 8 words by the coefficients, adds results of the multiplication and outputs the result of the product sum operation. It is to be noted that the product sum operation unit SoP adds the remaining pixel data of the second row (for example, the pixel data a8) to the product sum value of 8 words of the first row by an overtaking circuit not depicted.

Since the product sum operation unit SoP in the core CORE receives neighborhood matrix image data in the second DMA memory DMA_M1 after format conversion as an input thereto without performing a transposition process for the image data, there is no waiting circle before starting of arithmetic operation, and the utilization rate of the arithmetic unit may be increased.

[Product Sum Operation Unit with Overtaking Route]

Figure 13:
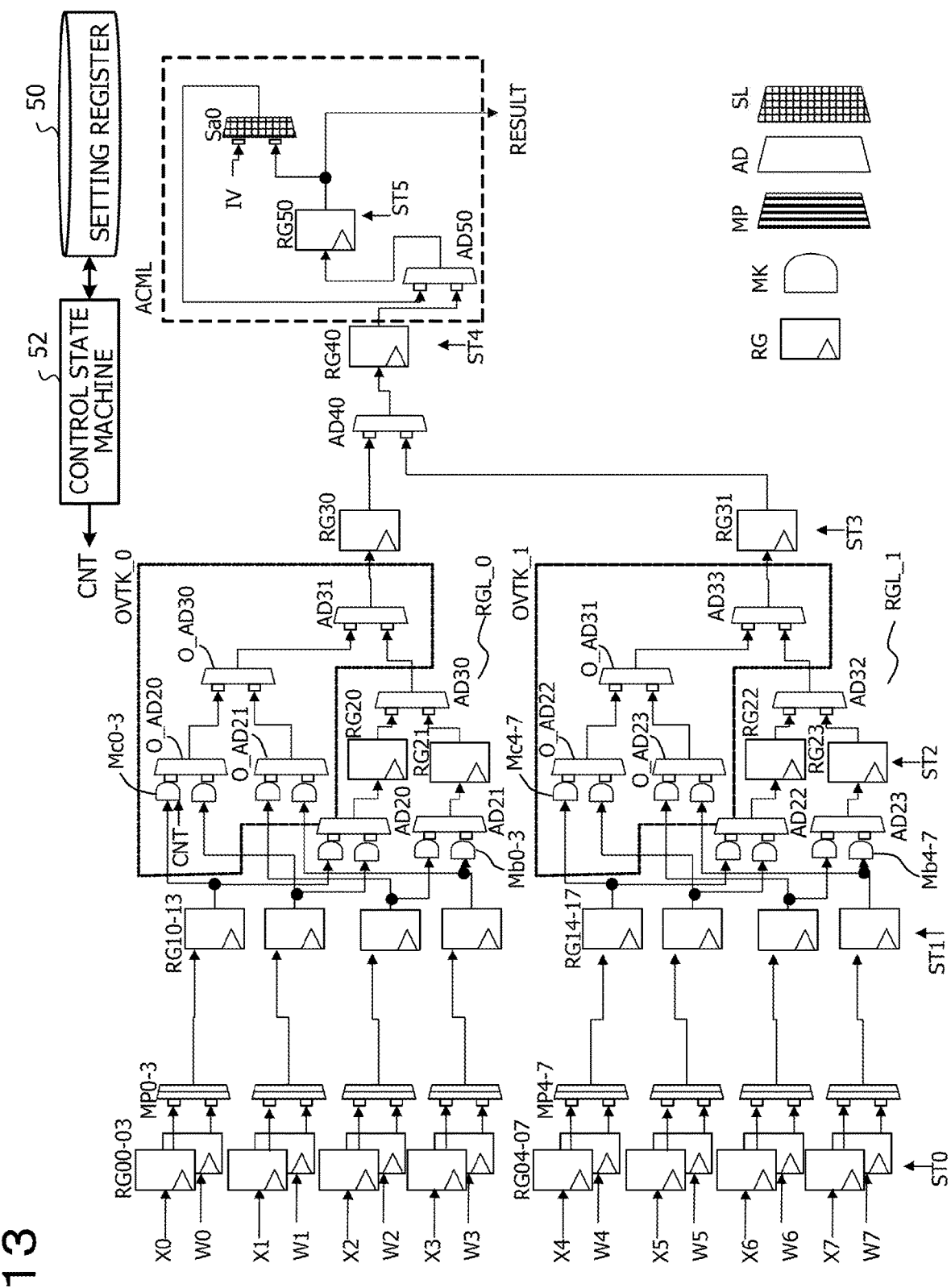
FIG. 13 depicts a configuration of a product sum operation unit with an overtaking route of the present embodiment.

FIG. 13 is a view depicting a configuration of a product sum operation unit with an overtaking route of the present embodiment. The product sum operation unit of FIG. 13 includes pipeline stages ST0 to ST5, each of which includes a plurality of or a single register RG. A clock not depicted is supplied to each register RG of each stage such that the register RG latches input data in response to the clock input.

First, the configuration of the product sum operation unit according to a regular route is described, and then the configuration of the product sum operation unit according to an overtaking route.

The input stage ST0 includes eight pairs of registers RG00 to RG03 and RG04 to RG07 for latching pixel data X0 to X7 and coefficients W0 to W7, respectively. Eight multipliers MP0 to MP3 and MP4 to MP7 in the stage ST1 multiply the pixel data X0 to X7 latched in eight registers in the input stage ST0 by the coefficients W0 to W7, respectively. Then, eight registers RG10 to RG13 and RG14 to RG17 of the stage ST1 individually latch multiplication values of the eight multipliers.

The stage ST2 includes an adder AD20 that adds the multiplication values X0*W0 and X1*W1, another adder AD21 that adds the multiplication values X2*W2 and X3*W3, a further adder AD22 that adds the multiplication values X4*W4 and X5*W5, and a still further adder AD23 that adds the multiplication values X6*W6 and X7*W7. Further, four registers RG20 to SR23 of the stage ST2 individually latch addition values of the adders AD20 to AD23.

Here, the four adders AD20 to AD23 have, at input terminals thereof paired with each other, masks Mb0 to Mb3 and Mb4 to Mb7, each of which allows or inhibits passage therethrough of (masks or not masks) an input signal thereto in accordance with a control signal CNT. For example, each of the masks Mb0 to Mb7 is an AND gate to which an output of a corresponding one of the registers RG10 to RG17 and a control signal CNT are inputted. If all of the control signals CNT for the masks Mb0 to Mb3 and Mb4 to Mb7 are set to "1" (passage), inputs to the adders AD20 to AD23 for the regular route are validated. If the control signals CNT for the masks Mb0 to Mb3 and Mb4 to Mb7 are set to "0" (non-passage), inputs to the adders AD20 to AD23 for the regular route are invalidated and the input value "0" is inputted to the adders AD20 to AD23.

The product sum operation unit further includes a setting register 50 to which parameters are set from a controlling core not depicted and a control state machine 52 that outputs control signals CNT described above based on the set parameters. If the control state machine 52 sets all of the control signals CNT for the masks Mb0 to Mb3 and Mb4 to Mb7 to "1" (passage), inputs to the adders AD20 to AD23 for the regular route are validated, and the four registers RG20 to RG23 of the stage ST2 latch addition values of the four adders AD20 to AD23, respectively, in a clock cycle for the regular route.

The stage ST3 includes adders AD30, AD31, AD32, and AD33, and two registers RG30 and RG31 that latch outputs of the adders AD31 and AD33. The stage ST4 includes an adder AD40 and a register RG40.

The stage ST5 configures an accumulator ACML that accumulates a product sum addition value of the eight sets of image data X0 to X7 and coefficients W0 to W7 latched by the register RG40 in synchronism with a clock. The initial value IV of the accumulator ACML is "0," and the adder AD50 adds the product sum value of the register RG40 to an input value selected by a selector Sa0, and the register RG50 latches the addition value. For example, the accumulator ACML cumulatively adds the product sum value of the register RG40. An output of the register RG50 is a result RESULT of the product sum adder.

The adders AD20 and AD21, registers RG20 and RG21 and adder AD30 configure a first regular addition circuit RGL_0 for the regular route. Meanwhile, the adders AD22 and AD23, registers RG22 and RG23 and adder AD32 configure a second regular addition circuit RGL_1 for the regular route. The components from the registers SR10 to SR13 and RG14 to RG17 of the stage ST1 to the adders AD30 and AD32 configure regular addition circuits RGL_0 and RGL_1, respectively.

The control state machine 52 sets the control signals CNT for the masks Mb0 to Mb3 and Mb4 to Mb7 for the regular route circuit to "1" and outputs the product sum value of the eight sets of image data X0 to X7 and coefficients W0 to W7 inputted thereto from the register RG40 in a cycle of five clocks. Then, the control state machine 52 controls the selector Sa0 to select the initial value IV side to reset the register RG50 in the accumulator ACML and then controls the selector Sa0 to select the register RG50 side to cumulatively add the product sum that is the output of the register RG40.

Now, the configuration of the overtaking route circuit is described. A first overtaking circuit OVTK_0 includes adders O_AD20, O_AD21 and O_AD30 for adding four sets of multiplication values X0*W0, X1*W1, X2*W2 and X3*W3 latched by the four registers R10 to R13 of the stage ST1. Similarly, a second overtaking circuit OVTK_1 includes adders O_AD22, O_AD23 and O_AD31 for adding four sets of multiplication values X4*W4, X5*W5, X6*W6 and X7*W7 latched by the four registers R14 to R17 of the stage ST1.

Then, the adders O_AD20, O_AD21, O_AD22 and O_AD23 have above-described masks Mc0 to Mc3 and Mc4 to Mc7 at paired input terminals thereof, and inputs to the masks Mc0 to Mc3 and Mc4 to Mc7 are controlled to selection (passage) or non-selection (non-passage) individually based on "1" or "0" of the control signals CNT from the control state machine 52. In the case of the non-selection, the input value "0" is inputted.

A register RG for partitioning the stages ST2 and ST3 is not interposed between the adders O_AD20 and O_AD21 and the adder O_AD30 in the first overtaking circuit. Similarly, a register RG for partitioning the stages ST2 and ST3 is not interposed between the adders O_AD22 and O_AD23 and the adder O_AD31 in the second overtaking circuit either. Accordingly, the adders O_AD20 and O_AD21 and the adder O_AD30 as well as the adders O_AD22 and O_AD23 and the adder O_AD31 output their addition results in one clock. By this configuration, in the overtaking circuits, multiplication values (values of the registers RG10 to RG13 and RG14 to R17) delayed by one cycle in the stage ST1 catch up with the addition values (AD30 and AD32) one cycle before in the stage ST3 and are added to the addition values one cycle before by the adders AD31 and AD33.

The addition circuit from the registers RG10 to RG13 to the register RG30 including the first overtaking circuit OVTK_0 in FIG. 13 is a minimum unit of an addition circuit with an overtaking circuit. In the addition circuit of a minimum unit, the adder AD31 adds, to multiplication values of pixel data and coefficient data inputted to the registers RG10 to RG13, multiplication values of pixel data and coefficients inputted to the registers RG10 to RG13 after a delay of one cycle, and the register RG30 latches the addition value.

A product sum circuit with an overtaking circuit of the minimum unit is configured by adding four multipliers MP and four pairs of registers RG00 to RG03 to the input side of the registers RG10 to RG13 of the addition circuit with an overtaking circuit of the minimum unit described above.

[Operation of 3×3 Filter]

FIG. 14 is a sequence diagram depicting operation of the product sum operation unit of FIG. 13 in a case of a 3×3 filter. Meanwhile, FIG. 15 is a sequence diagram similarly depicting selection and non-selection states of the masks Mb0_7 and Mc0_7. Operation of the product sum operation unit of FIG. 13 is described with reference to FIGS. 14 and 15.

In the case of a 3×3 filter, the pixel number of a neighborhood matrix is nine. On the other hand, the input number to the product sum operation unit of FIG. 13 is eight. Accordingly, it is not possible to input nine pixel data and nine coefficient data in one cycle, and they are inputted in two cycles. As a result, one pixel data and one coefficient data are inputted after a delay of one cycle. As described hereinbelow, the product sum operation unit includes an addition circuit of an overtaking route and may add a multiplication value of one pixel data and one coefficient data, which are inputted after a delay of one cycle, to multiplication values of eight pixel data and eight coefficient data in the same stage. Further, to multiplication values of an arbitrary number of pixel data and coefficient data inputted in a preceding cycle, the remaining number of pixel data and coefficient data inputted in a succeeding cycle may be added.

[Cycle 1]

The registers RG00 to RG07 of the stage ST0 latch eight pixel data a0 to a8 from among nine pixel data a0 to a8 in the first set and eight coefficients w0 to w7 (not depicted).

[Cycle 2]

The registers RG10 to RG17 of the stage ST1 latch multiplication values of the eight multipliers MP0 to MP7 (multiplication values of a0 to a7). In FIG. 14, a0*w0 to a7*w7 are indicated simply as a0 to a7 for the simplified illustration. Simultaneously, the registers RG00 to RG07 of the stage ST0 latch the ninth pixel data a8 and coefficient w8 and seven pixel data b0 to b6 and seven coefficient w0 to w6 of the second set. As hereinafter described, the multiplication value of the ninth pixel data a8 and coefficient w8 catch up the multiplication values of the first eight pixel data a0 to a7 and coefficients w0 to w7 through an overtaking route. In FIG. 14, an underline, <u>a8</u>, is added to the pixel data processed by an overtaking process through the overtaking route.

[Cycle 3]

The registers RG20 to RG23 in the regular route in the stage ST2 latch four sets of addition values a0 and a1, a2 and a3, a4 and a5, and a6 and a7 of the multiplication values of the eight pixel data a0 to a7 of the first set, respectively. Further, the registers RG10 to RG17 in the stage ST1 latch multiplication values of the first pixel data a8 of the first set and the seven pixel data b0 to b6 of the second set. Simultaneously, the registers RG00 to RG07 of the stage ST0 latch the eighth and ninth pixel data b7 and b8 and coefficients w7 and w8 of the second set and the six pixel data c0 to c5 and the six coefficients w0 to w5 of the third set.

[Cycle 4]

The register RG30 of the stage ST3 latches the addition value of the addition value a0 to a3 of the regular route and the value a8 of the overtaking route, and the register RG31 latches the addition value of the addition values a4 to a7 of the regular route. Consequently, the addition value a8 having delayed by one cycle catches up with and is added to the addition value of the regular route.

The registers RG20 to 23 of the regular route of the stage ST2 individually latch the four sets of addition values b0, b1 and b2, b3 and b4, and b5 and b6 of the multiplication values of the seven pixel data b0 to b6 of the second set, respectively. Further, the registers RG10 to RG17 of the stage ST1 latch the multiplication values of the two pixel data b7 and b8 of the second set and the six pixel data c0 to c5 of the third set. Simultaneously, the registers RG00 to RG07 of the stage ST0 latch the seventh to ninth pixel data c6 to c8 and coefficients w6 to w8 of the third set and the five pixel data d0 to d4 and five coefficients w0 to w4 of the fourth set.

[Cycle 5]

The register RG40 of the stage ST4 latches the addition value a0 to a8 of the nine pixel data a0 to a8 of the first set. As a result, the arithmetic unit may output an addition value of nine pixel data, for example, an addition value of the nine pixel data a0 to a8 inputted divisionally in the cycles 1 and 2, in five cycles required to output an addition value of eight pixel data inputted in one cycle. For example, an addition value that includes the pixel data a8 inputted in the cycle 2 and added thereto may be generated in the cycle 5 without a delay to the cycle 6. For example, it may not necessary to cumulatively add the addition value of the eight pixel data a0 to a7 and the value of the one pixel data a8 in the cycle 6 by the accumulator ACML.

The register RG30 of the stage ST3 latches the addition value of the addition value b0 to b2 of the regular route and the values b7 and b8 of the overtaking route, and the register RG31 latches the addition value of the addition value b3 to b6 of the regular route. Consequently, the addition value b7 and b8 having delayed by one cycle catch up with and are added to the addition value of the regular route.

The registers RG20 to RG23 of the regular route of the stage ST2 latch the three sets of addition values c0 and c1, c2 and c3, and c4 and c5 of the multiplication values of the third set of the six pixel data c0 to c5, respectively. Meanwhile, the adder O_AD20 of the overtaking route adds the addition value of the pixel data b7 and b8. Further, the registers RG10 to RG17 of the stage ST1 latch the multiplication values of the three pixel data c6 to c8 of the third set and the five pixel data d0 to d4 of the fourth sets, respectively. Simultaneously, the registers RG00 to RG07 of the stage ST0 latch the sixth to ninth pixel data d5 to d8 and coefficients w5 to w8 of the fourth set and the four pixel data e0 to e3 and the four coefficients w0 to w3 of the fifth set.

[Cycle 6 and Following Cycles]

Similarly as described above, in the cycle 6, the register RG50 of the stage ST5 latches the addition value a0 to a8 of the multiplication values of the nine pixel data a0 to a8 of the first set. The addition value a0 to a8 becomes a result RESULT of the product sum operation unit. In the cycle 7, the register RG50 latches the addition value b0 to b8 of the multiplication values of the nine pixel data b0 to b8 of the second set. The addition value b0 to b8 becomes a result RESULT of the product sum operation unit. The same applies in the following cycles.

As depicted in FIG. 15, the masks Mb0 to Mb7 of the regular route and the masks MC0 to MC7 of the overtaking route are controlled in the following manner. In the cycles 1 to 3, all masks Mb0 to Mb7 of the regular route are controlled to [1] selection and all masks Mc0 to Mc7 of the overtaking route are controlled to [0] non-selection. Consequently, the adders of the overtaking route in the stage ST2 do not output a substantial addition value but output an addition value of "0."

Then, in the cycle 4, the mask Mb0 of the regular route is controlled to "0" non-selection and the mask Mc0 of the overtaking route is controlled to "1" selection. Then, in the cycles 5 to 11 after the cycle 4, the number of "0s" of the masks Mb of the regular route increases one by one, and together with this, the number of "1s" of the masks Mc of the overtaking route increases one by one. Then, in the cycle 12, all of the masks Mb and Mc are reset to restore the set values in the cycle 1. For example, the masks Mb0 to Mb7 of the regular route and the masks Mc0 to Mc7 of the overtaking route exclusively place the outputs of the registers RG10 to RG17 to selection and non-selection in accordance with the control signals CNT, respectively.

In the case of the 3×3 filter described above, since the pixel number is nine, the accumulator ACML does not cumulatively operate the product sum value of the register RG40.

[Operation of 5×5 Filter]

FIG. 16 is a sequence diagram depicting operation of the product sum operation unit of FIG. 13 in a case of a 5×5 filter. In the case of a 5×5 filter, the pixel number of a neighborhood matrix is 25. Accordingly, it is not possible to input 25 pixel data and 25 coefficient data in one cycle, and 24 pixels are inputted with eight pixels each in three cycles and the remaining one pixel is inputted in one cycle. Therefore, as described below, product sum values of 8 inputs inputted in three cycles are accumulated by an accumulator, and a multiplication value of one input inputted in the last one cycle is added to the multiplication value of the third cycle through an overtaking route.

Product sum operation of 25 pixel data a0 to a24 and 25 coefficient data of the first set is described. As depicted in FIG. 16, two sets of 8-input pixel data a0 to a7 and a8 to a15 inputted in the cycles 1 and 2 are operated by product sum operation through a regular route and are accumulated by the adder AD50 of the stage ST5 and latched by the register RG50 in the cycle 7. Then, one set of 8-input pixel data a16 to a23 inputted in the cycle 3 and one-input pixel data a24 inputted in the cycle 4 are added by the adder AD31 of the stage ST3 in the cycle 6 through the overtaking route and is latched by the register RG30. As a result, in the cycle 7, the register RG40 of the stage ST4 latches the product sum value of 9-input pixel data a16 to a24 in the cycle 7, and in the cycle 8, the adder AD50 of the stage ST5 accumulates the product sum value of the 9 input pixel data a16 to a24 and the register RG50 latches the product sum value of the 25 pixel data a0 to a24 in the cycle 8.

Now, product sum operation of 25 pixel data b0 to b24 and 25 coefficient data of the second set is described. Two sets of 7-input pixel data b0 to b6 and 8-input pixel data b7 to b14 inputted in the cycles 4 and 5 are subjected to product sum operation in a regular route, and the product sums are accumulated into the adder AD50 of the stage ST5 and the register RG50 latches the accumulated product sum in the cycle 10. Then, one set of 8-input pixel data b15 to b22 inputted in the cycle 6 and multiplication values of 2-input pixel data b23 and b24 inputted in the cycle 7 are added by the adder AD31 of the stage ST3 through the overtaking route and is latched into the register RG30 in the cycle 9. As a result, in the cycle 10, the register RG40 of the stage ST4 latches the product sum value of the 10-input pixel data b15 to b24, and the adder AD50 of the stage ST5 accumulates the product sum values and the register RG50 latches the product sum value of the 25 pixel data b0 to b24 in the cycle 11.

Also product sum operation of the third set of 25 pixel data c0 to c24 and 25 coefficient data is performed similarly to that described above.

[Operation of 11 Pixels]

FIG. 17 is a sequence diagram depicting operation of a product sum operation unit in a case where one set of input pixel data is of 11 pixels. In the case where one set includes 11 pixels, 11 pixels a0 to a10 in the first set are inputted in the cycles 1 and 2, and the register RG40 of the stage ST4 latches the product sum value of the pixel data a0 to a10 in the cycle 5. Eleven pixels b0 to b10 in the second set are inputted in the cycles 2 and 3, and the register RG40 of the stage ST4 latches the product sum value of the pixel data b0 to b10 in the cycle 6. The first and second 11 pixel data a0 to a10 and b0 to b10 are not subject to cumulative addition by the accumulator.

On the other hand, 11 pixels c0 to c10 in the third set are inputted in the cycles 3, 4 and 5. Accordingly, the product sum values of the two pixel data c0 and c1 inputted in the cycle 3 and the pixel data c2 to c9 and c10 inputted in the cycles 4 and 5, respectively, are accumulated in the cycle 9, and the register RG50 of the stage ST5 latches the product sum value of the 11 pixel data c0 to c10.

In this manner, in the case where one set includes 11 pixels, the overtaking route pixel number and the operation cycles in which the overtaking route operates and the cycles of accumulation addition by the accumulator may be predicted in advance based on given arithmetic expressions although complicated variations are involved.

[Product Sum Operation Unit Ready for 32 Pixels]

Figure 18:
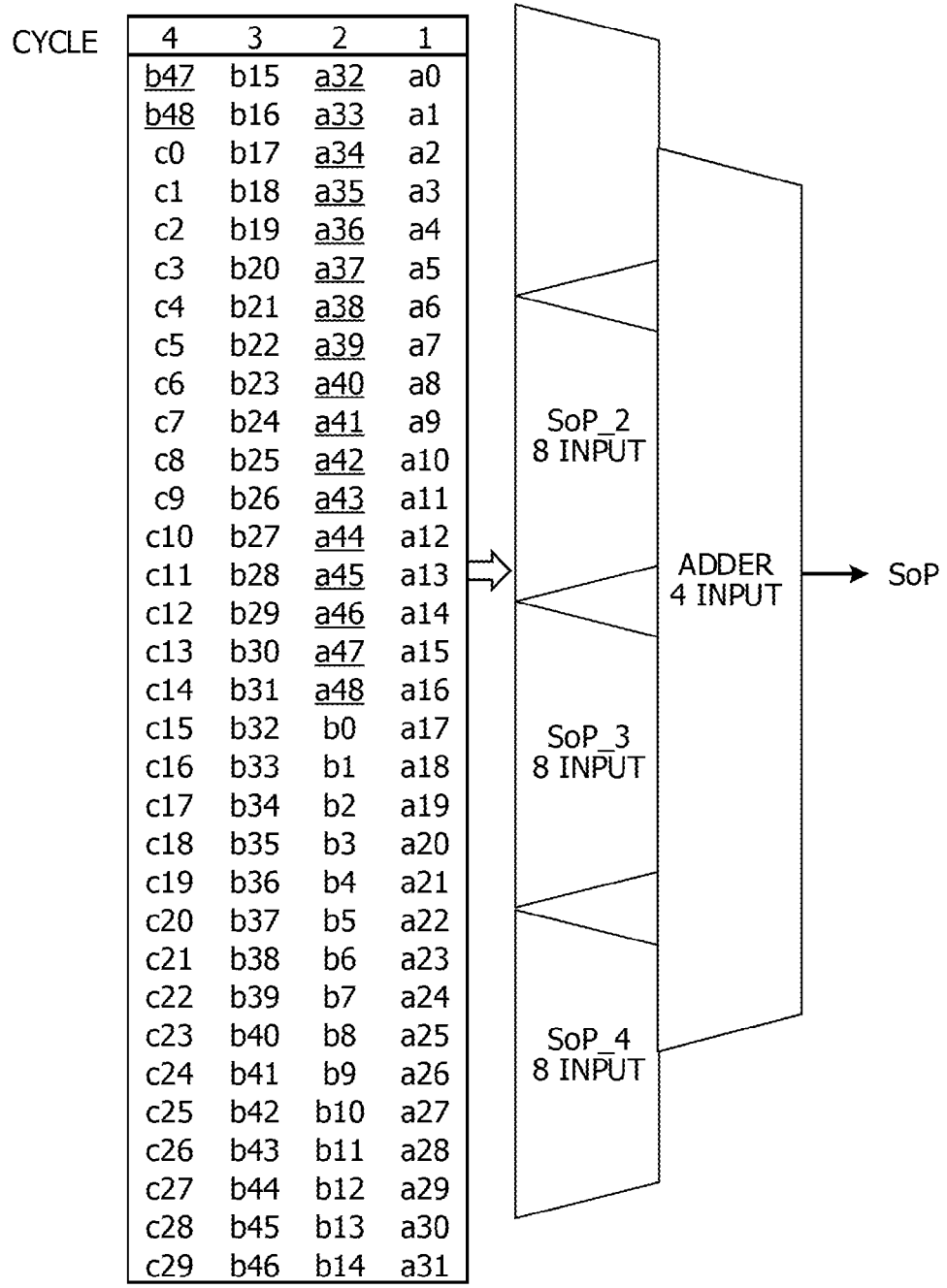
FIG. 18 depicts a configuration of a product sum operation unit to which up to 32-pixel data may be inputted.

FIG. 18 is a view depicting a configuration of a product sum operation unit to which up to 32 pixel data may be inputted. The product sum operation unit ready for 32 pixels includes four 8-input product sum operation units SoP of FIG. 13 and an adder ADDER that adds product sum values outputted from the four product sum operation units SoP. The four product sum operation units SoP disposed in parallel individually have an overtaking route as described hereinabove with reference to FIG. 13.

Figure 19:
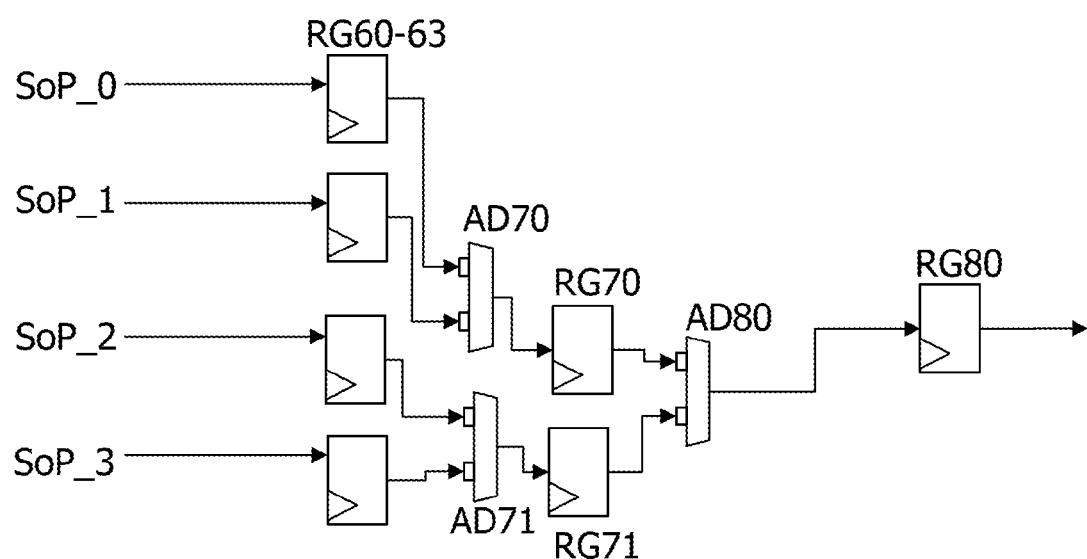
FIG. 19 depicts an example of a configuration of an adder of FIG. 18.

FIG. 19 is a view depicting an example of a configuration of the adder ADDER of FIG. 18. The adder ADDER includes four input registers RG60 to RG63 for latching product sum values of the four product sum operation units SoP_0 to SoP_3, two adders AD70 and AD71 that individually add two different ones of the four product sum values, two registers RG70 and RG71 that latch outputs of the adders AD70 and AD71, an adder AD80 that adds outputs of the registers RG70 and RG71, and an output register RG80 that latches an output of the adder AD80.

The input pixel data depicted in FIG. 18 correspond to a 7×7 filter and are 49 pixel data a0 to a48 and b0 to b48 in one set. Accordingly, to the product sum operation units SoP, 49 pixel data and 49 coefficients w0 to w48 of one set are inputted in two cycles. Then, in regard to the 49 pixel data a0 to a48 of the first set, the pixel data a32 to a48 inputted in the cycle 2 are added to the accumulation value of the pixel data a0 to a31 inputted in the cycle 1 through overtaking routes of the product sum operation units SoP_0, SoP_1 and SoP_2.

In regard to the 49 pixel data b0 to b48 of the second set, the pixel data b0 to b14 inputted in the cycle 2 are cumulatively added to the pixel data b15 to b48, which are inputted in the cycles 3 and 4 and added by overtaking routes, by the accumulator.

Second Embodiment

Figure 20:
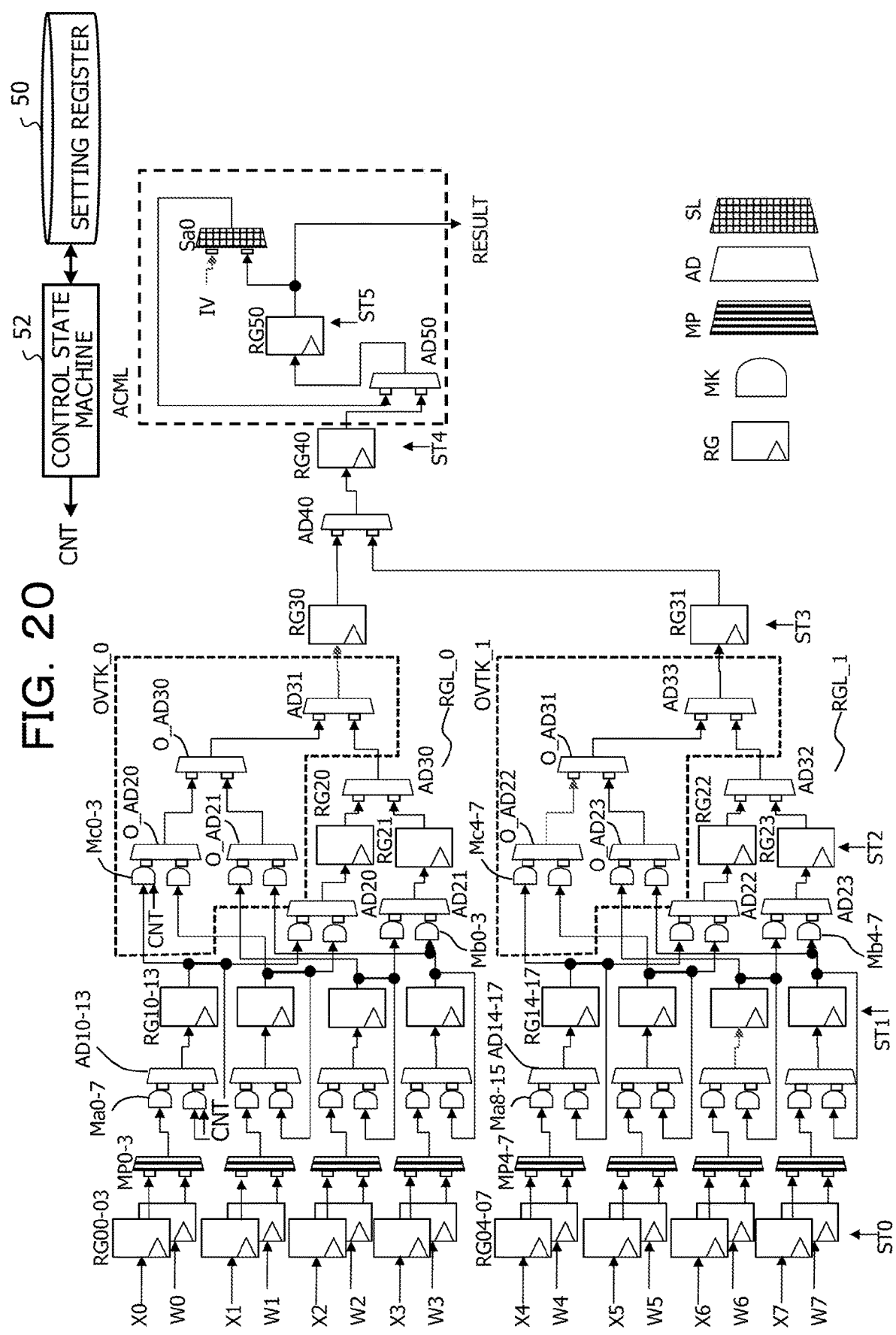
FIG. 20 depicts a configuration of a product sum operation unit with an overtaking route according to a second embodiment.

FIG. 20 is a view depicting a configuration of a product sum operation unit with an overtaking route in a second embodiment. The product sum operation unit of FIG. 20 may perform, depending upon settings, changeover between first arithmetic operation for arithmetically operating image data of the SOA form similar to that of FIG. 13 and second arithmetic operation for arithmetically operating image data of the AOS form. The second arithmetic operation is the arithmetic operation depicted in FIG. 8C.

The product sum operation unit of FIG. 20 includes, in addition to the components of the product sum operation unit of FIG. 13, adders AD10 to AD13 and AD14 to AD17 individually interposed between the multipliers MP0 to MP3 in the stage ST1 and the registers RG10 to RG17 and including, at paired input terminals thereof, masks Ma0 and Mal, Mat and Ma3, Ma4 and Ma5, and Ma6 and Ma7, and Ma8 and Ma9, Ma10 and Ma11, Ma12 and Ma13, and Ma14 and Ma15, respectively, and feedback lines FB provided between outputs of the registers RG10 to RG17 and inputs of the SL10 to SL13 and SL14 to SL17.

The masks Ma0 to Ma7 and Ma8 to Mal5 are same as the masks Mb0 to Mb7 and Mc0 to Mc7 of FIG. 13. In the case of first arithmetic operation where pixel data of the SOP form are inputted, the control signal "1" is inputted to odd-numbered ones of the masks Ma0 to Ma7 and Ma8 to Ma15, and the control signal "0" is inputted to even-numbered ones of the masks Ma0 to Ma7 and Ma8 to Ma15, and the inputs to the feedback lines FB are set to non-selection (input value "0"). As a result, the product sum operation unit of FIG. 20 becomes same as that of FIG. 13.

On the other hand, in the case of the second arithmetic operation where pixel data of the AOS form are inputted, the control signal "1" is inputted to all of the masks Ma0 to Ma7 and Ma8 to Ma15 such that output data of the registers RG10 to R13 of the feedback lines FB are selected. As a result, an accumulator is configured from the adders AD10 to AD13 and AD14 to AD17 and the registers RG10 to RG13 and RG14 to RG17.

FIG. 21 is a view depicting the product sum operation unit of FIG. 20 in a case of second arithmetic operation. In the case of the second arithmetic operation, the product sum operation unit includes eight sets of registers RG00 to FG07 of the input stage ST0, multipliers MP0 to MP7, adders AD10 to AD17 and registers RG10 to RG17 of the stage ST1. Then, eight accumulators configured from the adders AD10 to AD17, registers RG10 to RG17 and feedback lines FB individually cumulatively add a multiplication value of a multiplier MP eight times in synchronism with a clock thereby to perform product sum operation of the eight sets of nine pixel data a0 to a8 to h0 to h8 and nine coefficient data w0 to w8.

Figure 22:
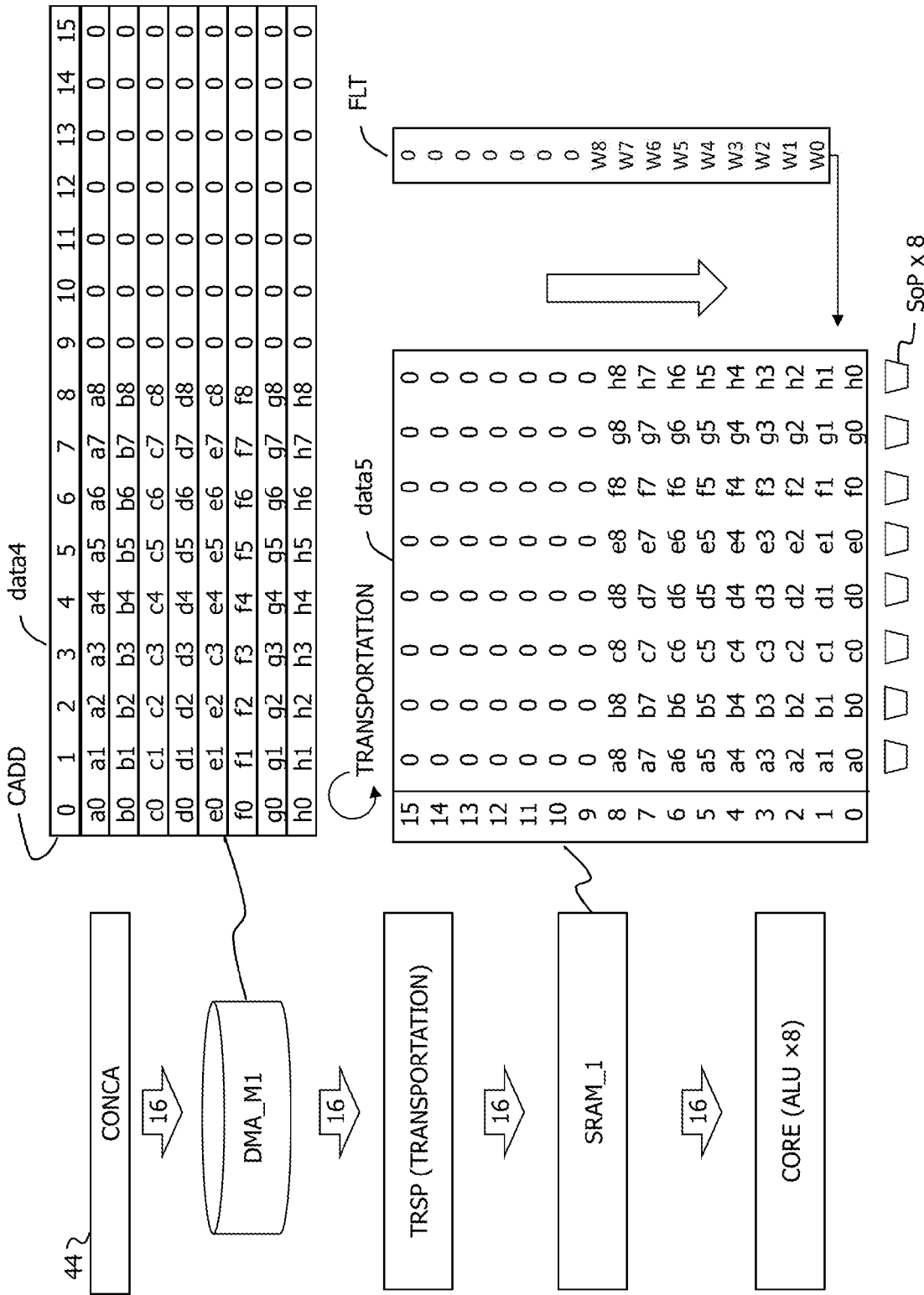
FIG. 22 illustrates format conversion for generating pixel data of an AOS.

FIG. 22 is a view depicting format conversion for generating pixel data of an AOS. Eight sets of data data1 generated by the format conversion circuit 40 in FIG. 11 are accumulated into a second DMA memory DMA_M1 by the concatenation 44 to generate data data4. Then, the transposition circuit TRSP reverses columns and rows of the data DATA4 to form image data data5 of an AOS and inputs the image data data5 to the second high speed memory SRAM_1. As a result, the eight sets of the nine pixel data data5 and the nine coefficient data W0 to W7 are serially inputted in parallel and in synchronism with the clock to the eight product sum operation units SoP depicted in FIG. 21. Then, after a given number of clocks (after a given number of cycles), the eight sets of product sum values (characteristic amounts of the noticed pixel of the neighborhood matrix) are outputted in parallel.

As described above, according to the present embodiment, since an overtaking route is provided in a product sum operation unit, in regard to one set of data exceeding eight data that are inputted in two cycles, a product sum value may be generated in a same clock cycle. Further, since an accumulator is provided at an output of the product sum operation unit, product sum values of data inputted in a plurality of cycles may be cumulatively added.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor, comprising:
   a plurality of processor cores; and
   an internal memory configured to be accessed from the plurality of processor cores,
   wherein an arithmetic circuit provided in any of the plurality of processor cores includes:
   a plurality of first registers provided in a first stage of the arithmetic circuit,
   a regular addition circuit including a first adder and a second register, the first adder being configured to add a plurality of outputs of the plurality of first registers, the second register being configured to be provided in a second stage and latch an output of the first adder,
   an overtaking addition circuit including a second adder, the second adder being configured to add a plurality of outputs of the plurality of first registers, and
   a synthesis circuit including a third adder and a third register, the third adder being configured to add an output of the regular addition circuit and an output of the overtaking addition circuit, the third register being provided in a third stage of the arithmetic unit and being configured to latch an output of the second adder,
   wherein each of the first adder and the second adder is configured to exclusively select and receive a plurality of outputs of the plurality of first registers as inputs thereto, and
   wherein each of the first, second and third registers is configured to latch the inputs thereto in synchronism with a clock.

2. The processor according to claim 1,
   wherein the arithmetic circuit includes:
   a plurality of pairs of input registers that are provided in an input stage, each of the plurality of pairs of input registers being configured to latch first input data and second input data; and
   a plurality of multipliers, each of the plurality of multipliers being associated with any of the plurality of pairs of input registers, and being configured to obtain a multiplication value by multiplying the first input data and the second input data, and being configured to cause any of the plurality of first registers to latch the multiplication value, and
   wherein product sum circuits are formed by the multipliers and the addition circuits, each of the product sum circuits being configured to add the plurality of first input data and the plurality of second input data.

3. The processor according to claim 2, wherein
   the arithmetic unit includes:
   a control circuit configured to set first control values for the selection to mask circuits provided at inputs of the first adder and the second adder,
   in a case where the number of one set of arithmetic operation target data is greater than the number of the plurality of pairs of input registers, the set of arithmetic operation target data is divisionally inputted to the plurality of pairs of input registers in a plurality of cycles, and
   the control circuit is further configured to
   input second multiplication values of the first input data and the second input data included in the arithmetic operation target data and inputted in a second cycle next to the first cycle to the second adder, and
   set, to the mask circuits, the first control values for inputting first multiplication values of the first input data and the second input data included in the arithmetic operation target data and inputted in a first cycle to the first adder.

4. The processor according to claim 2,
   wherein the arithmetic unit includes a plurality of fourth adders between the plurality of multipliers and the plurality of first registers, each of the plurality of fourth adders being configured to add outputs of the plurality of multipliers and outputs of the plurality of first registers, and
   wherein the arithmetic unit includes mask circuits at input of the plurality of fourth adders, each of the mask circuits being configured to set a plurality of outputs of the plurality of first registers to one of inputting and non-inputting states.

5. The processor according to claim 2, wherein
   the plurality of first input data are a plurality of pixel data of a neighborhood matrix of image data,
   the plurality of second input data are a plurality of coefficient data of a coefficient matrix corresponding to the neighborhood matrix, and
   each of the product sum circuits is configured to calculate a product sum value of the plurality of pixel data of the neighborhood matrix and the plurality of coefficient data of the coefficient matrix.

6. The processor according to claim 1, wherein
   the arithmetic unit includes:
   an accumulator circuit configured to accumulate outputs of the addition circuits in synchronism with the clock.

7. An information processing apparatus, comprising:
   a processor; and
   a main memory configured to be accessed from the processor;
   wherein the processor includes
   a plurality of processor cores, and
   an internal memory configured to be accessed from the plurality of processor cores,
   wherein an arithmetic unit provided in any of the plurality of processor cores includes
   a regular addition circuit including a first adder and a second register, the first adder being configured to add a plurality of outputs of the plurality of first registers, the second register being configured to be provided in a second stage and latch an output of the first adder,
   an overtaking addition circuit including a second adder, the second adder being configured to add a plurality of outputs of the plurality of first registers, and
   a synthesis circuit including a third adder and a third register, the third adder being configured to add an output of the regular addition circuit and an output of the overtaking addition circuit, the third register being configured to be provided in a third stage and latch an output of the second adder,
   wherein each of the first adder and the second adder is configured to exclusively select and receive a plurality of outputs of the plurality of first registers as inputs thereto, and wherein each of the first, second and third registers is configured to latch the inputs thereto in synchronism with a clock.

8. An operation method for a processor, the processor including a plurality of processor cores and an internal memory, the internal memory being configured to be accessed from the plurality of processor cores, any of the plurality of processor cores having an arithmetic unit, the arithmetic unit including first registers, a regular addition circuit, an overtaking addition circuit, and a synthesis circuit, the first registers being provided in a first stage of the arithmetic circuit, the regular addition circuit including a first adder and a second register, the first adder being configured to add a plurality of outputs of the plurality of first registers, the second register being provided in a second stage of the arithmetic circuit and being configured to latch an output of the first adder, the overtaking addition circuit including a second adder configured to add a plurality of outputs of the plurality of first registers, and the synthesis circuit including a third adder and a third register, the third adder being configured to add an output of the regular addition circuit and an output of the overtaking addition circuit, and the third register being provided in a third stage of the arithmetic unit and being configured to latch an output of the second adder, the operation method comprising:

causing the first adder and the second adder to exclusively select and receive a plurality of outputs of the plurality of first registers as inputs thereto;

causing the first, second and third registers to latch inputs thereto in synchronism with a clock;

causing the first adder to add a single or a plurality of first input data inputted in a first cycle and causing the second register to latch the addition value by the first adder;

causing the second adder to add a single or a plurality of second input data inputted in a second cycle next to the first cycle; and causing the third adder to add an output of the regular addition circuit and an output of the overtaking addition circuit and causing the third register to latch the addition value by the third adder.

* * * * *